(12) United States Patent
Taguchi

(10) Patent No.: US 8,929,250 B2
(45) Date of Patent: Jan. 6, 2015

(54) THIN CLIENT ENVIRONMENT PROVIDING SYSTEM, SERVER, THIN CLIENT ENVIRONMENT MANAGEMENT METHOD AND THIN CLIENT ENVIRONMENT MANAGEMENT PROGRAM

(75) Inventor: Masahiko Taguchi, Tokyo (JP)

(73) Assignee: NEC Corporation, Tokyo (JP)

(*) Notice: Subject to any disclaimer, the term of this patent is extended or adjusted under 35 U.S.C. 154(b) by 370 days.

(21) Appl. No.: 13/415,775

(22) Filed: Mar. 8, 2012

(65) Prior Publication Data

US 2012/0230223 A1 Sep. 13, 2012

(30) Foreign Application Priority Data

Mar. 11, 2011 (JP) ................................ 2011-054138

(51) Int. Cl.
*H04L 12/28* (2006.01)
*H04L 12/54* (2013.01)
*H04L 12/46* (2006.01)
*G06F 9/455* (2006.01)
*H04L 12/24* (2006.01)
*H04L 12/751* (2013.01)
*H04L 12/911* (2013.01)

(52) U.S. Cl.
CPC ........ *H04L 12/4641* (2013.01); *H04L 12/5696* (2013.01); *H04L 41/08* (2013.01); *H04L 45/02* (2013.01); *H04L 47/72* (2013.01); *G06F 9/45558* (2013.01); *H04L 41/12* (2013.01)
USPC ............................ 370/254; 709/226; 709/245

(58) Field of Classification Search
None
See application file for complete search history.

(56) References Cited

U.S. PATENT DOCUMENTS

| | | | |
|---|---|---|---|
| 7,885,276 B1 | 2/2011 | Lin | |
| 2008/0071961 A1* | 3/2008 | Higuchi et al. | ............... 710/312 |
| 2008/0172492 A1 | 7/2008 | Raghunath et al. | |
| 2010/0014526 A1* | 1/2010 | Chavan et al. | ........... 370/395.53 |
| 2010/0058051 A1 | 3/2010 | Imai | |
| 2010/0325257 A1* | 12/2010 | Goel et al. | ..................... 709/223 |
| 2011/0119748 A1* | 5/2011 | Edwards et al. | ................ 726/12 |
| 2011/0173295 A1* | 7/2011 | Bakke et al. | .................. 709/217 |

(Continued)

FOREIGN PATENT DOCUMENTS

| | | |
|---|---|---|
| JP | 2010-062738 A | 3/2010 |
| JP | 2000-134248 A | 5/2010 |
| WO | WO 2009/147631 A1 | 12/2009 |

OTHER PUBLICATIONS

European Search Report dated May 16, 2012.

*Primary Examiner* — Timothy J Weidner
(74) *Attorney, Agent, or Firm* — McGinn IP Law Group, PLLC

(57) ABSTRACT

A thin client environment providing system includes a data center including at least one hypervisor and at least one layer 2 switch, a server, and at least one terminal computer. The server includes a VLAN group reservation unit which when receiving, from the terminal computer, a virtual machine addition request, obtains, from a data center DB, information of a hypervisor group and information of the layer 2 switch corresponding to the generation destination hypervisor, extracts, from a tenant DB, the VLAN group corresponding to the information of the hypervisor group, and the information of the tenant and information of the OS, and registers the indexed VLAN group with the tenant DB to reserve the VLAN group. A VLAN structure instructing unit which, when none of the VLAN group is registered with a switch DB, registers the information of the layer 2 switch and the information of the VLAN group.

23 Claims, 17 Drawing Sheets

(56) References Cited

U.S. PATENT DOCUMENTS

| | | | |
|---|---|---|---|
| 2012/0014387 A1* | 1/2012 | Dunbar et al. | 370/395.53 |
| 2012/0054486 A1* | 3/2012 | Lakkavalli et al. | 713/156 |
| 2012/0158806 A1* | 6/2012 | Snyder et al. | 707/827 |
| 2012/0159245 A1* | 6/2012 | Brownlow et al. | 714/23 |
| 2012/0230223 A1* | 9/2012 | Taguchi | 370/254 |
| 2012/0287936 A1* | 11/2012 | Biswas et al. | 370/395.3 |
| 2013/0019277 A1* | 1/2013 | Chang et al. | 726/1 |
| 2013/0238775 A1* | 9/2013 | Taguchi | 709/223 |

* cited by examiner

FIG. 5

VIRTUAL MACHINE DB  210

| HYPERVISOR GROUP A | HYPERVISOR 1 | LAYER 2 SWITCH A |
|---|---|---|
| HYPERVISOR GROUP A | HYPERVISOR 2 | LAYER 2 SWITCH B |
| HYPERVISOR GROUP B | HYPERVISOR 3 | LAYER 2 SWITCH C |

TENANT DB  220

| TENANT 1 | HYPERVISOR GROUP A | VLAN GROUP 1 | OS INFORMATION 1 |
|---|---|---|---|
| TENANT 2 | HYPERVISOR GROUP B | VLAN GROUP 1 | OS INFORMATION 2 |
| TENANT 2 | HYPERVISOR GROUP A | VLAN GROUP 2 | OS INFORMATION 2 |
| TENANT 1 | HYPERVISOR GROUP B | VLAN GROUP 2 | OS INFORMATION 3 |

SWITCH DB  221

| LAYER 2 SWITCH A | VLAN GROUP 1 |
|---|---|
| LAYER 2 SWITCH C | VLAN GROUP 1 |
| LAYER 2 SWITCH B | VLAN GROUP 2 |
| LAYER 2 SWITCH C | VLAN GROUP 2 |

VIRTUAL MACHINE DB  222

| TENANT 1 | HYPERVISOR 1 | VIRTUAL MACHINE NAME A |
|---|---|---|
| TENANT 2 | HYPERVISOR 3 | VIRTUAL MACHINE NAME B |
| TENANT 2 | HYPERVISOR 2 | VIRTUAL MACHINE NAME C |
| TENANT 1 | HYPERVISOR 3 | VIRTUAL MACHINE NAME D |
| TENANT 1 | HYPERVISOR 1 | VIRTUAL MACHINE NAME E |

THIN CLIENT ENVIRONMENT PROVIDING SYSTEM, SERVER, THIN CLIENT ENVIRONMENT MANAGEMENT METHOD AND THIN CLIENT ENVIRONMENT MANAGEMENT PROGRAM

TECHNICAL FIELD

The present invention relates to a technique of automatically setting a network in a thin client environment and, more particularly, a technique of setting up a VLAN (Virtual Local Area Network) on demand at the time of adding a virtual machine in service for lending a thin client environment (DaaS: Desktop as a Service) to a tenant (an organization unit such as a corporation).

BACKGROUND ART

Thin client is a generic name of a system in which main processing of a computer is executed in a server with respect to processing requested by a user, so that a terminal client executes minimum processing such as input/output.

Merit of a thin client is preventing information leakage by not having data in a terminal client to improve productivity through application of a security patch in the lump to a server by an expert staff officer.

Since the system can be used irrespectively of a place where a terminal client is disposed, it is possible to cope with disaster control measures and various work styles.

It is also possible to reduce costs in the entire thin client while realizing a high security level and high availability by investing only to an in-house server having data.

On the other hand, while a thin client has a low total cost because a long-term operation cost is low, an introduction cost may be higher than that of a system using ordinary computer and network.

Accordingly, when using a thin client environment while avoiding high introduction cost, service called DaaS will be used at a meter rate.

Appearance of the service is shown in FIG. 16.

FIG. 16 is a diagram showing service of lending a thin client environment according to the background art. The service comprises a thin client environment 610 including a virtual machine 650 and a virtual machine terminal 630.

The virtual machine 650 has a function of executing actual processing of a computer. The virtual machine terminal 630 has a function of executing input/output for the processing of the virtual machine 650. The thin client environment 610 represents that a tenant user operates the virtual machine 650 by the virtual machine terminal 630.

The tenant user connects to the virtual machine 650 through a remote network 620 and a tenant network 640 in a data center by using the virtual machine terminal 630. For the connection, used is an RDP (Remote Desktop Protocol) protocol or an ICA (Independent Computing Architecture) protocol, for example.

The virtual machine terminal 630 is a dedicated terminal or terminal software operable thereon which is realized by a real computer or a virtual computer having at least a CPU (Central Processing Unit), a memory, an input device such as a mouse or a keyboard and an output device such as a display.

A remote network 620 is a network leading to a data center 600 from the virtual machine terminal 630 and is realized by VPN (Virtual Private Network) connection to the data center 600 from an internal network in an office of a tenant, for example.

The tenant network 640 in a data center, which freely communicates with a virtual machine of a tenant and cuts off connection from other tenant, is realized by equipment such as a physical cable switch router or virtual network software.

The virtual machine 650 is a virtual computer operable on a hypervisor. After connection, input through an input device of the virtual machine terminal 630 and output through an output device of the virtual machine terminal 630 which are executed from/to the virtual machine 650 realize the thin client environment 610.

Mechanism of the data center tenant network 640 in the data center 600 is shown in FIG. 17.

The virtual machine 650 has a virtual NIC (Network Interface Card) 724 and at the time of communication via a physical NIC 727 of a hypervisor 720, executes VLAN-setting at a VLAN group setting unit 726.

When using a tag VLAN with the Ethernet mounted, for example, VLANID is set at an Ethernet frame. An Ethernet frame is transmitted to a physical NIC 713 of a layer 2 switch 710, is delivered in a VLAN 712 formed by the layer 2 switch 710, is passed from the physical NIC 713 of the layer 2 switch 710 through the physical NIC 727 of the hypervisor 720, has the VLAN setting released at the VLAN group setting unit 726 and is received by the virtual NIC 724. Accordingly, the VLAN group realizes the tenant network 640 in the data center.

As described in the foregoing, a virtual machine used by a tenant in the service of lending a thin client environment operates on a hypervisor managed by a service provider. In a thin client environment, a virtual machine in a tenant is allowed to freely communicate to do a job.

Since a tenant needs no equipment to be owned by itself, it is possible to reduce introduction costs, as well as putting operation of equipment into a charge of a highly reliable data center, resulting in increasing business continuity.

Since a service provider manages a large-scale thin client environment at a data center, operation costs will be intercepted. Therefore, cost cutting is realized by sharing equipment for use in a thin client environment among tenants.

On this occasion, unless network confidentiality is ensured among tenants, communication of other tenant will be received. However, since a thin client environment is prepared as soon as a tenant requires, it is impossible to set a network at equipment of a data center in advance, so that every time the tenant asks for a thin client environment, the network will be set on demand.

In other words, security setting of a network to be connected to a hypervisor in which a virtual machine is to be generated should be executed for the first time when creating a virtual machine.

Patent Literature 1: Patent Laying-Open No. 2010-062738
Patent Literature 2: Patent Laying-Open No. 2000-134248

In the Patent Literature 1, used as a method of setting up a tenant network in a data center on demand is VPN. In the tenant network in a data center, a virtual machine is connected by a mesh topology VPN, which makes communication between virtual machines of the tenant be possible to have accessibility and makes communication between virtual machines of other tenant be impossible to have confidentiality. The Patent Literature 1, however, has the following two problems.

First, since for a number n of virtual machines, two to the power of n of VPN tunnels are required, the amount of time calculation will be O(2^n), so that the larger the number of virtual machines becomes, the longer time the processing takes.

Secondly, because tenants are discriminated by an IP address, it is technically impossible for a virtual machine of other tenant to use the same IP address, so that sharing a thin client environment among tenants will involve limitation that the same IP address cannot be used by other tenant. Therefore, at the time of providing service for a thin client environment, VPN is not practical as a method of setting up a tenant network in a data center on demand.

In the Patent Literature 2, used as a method of setting up a tenant network in a data center on demand is VLAN. Since a layer 2 switch has an external interface for setting up a VLAN and a network segment is logically divided by the VLAN, communication between virtual machines of the same tenant is possible to have accessibility and communication between virtual machines of other tenant is impossible to have confidentiality.

Since each layer 2 switch has an independent VLAN structure, structuring a VLAN with a plurality of layer 2 switches causes connection to VLAN of other tenant to lose confidentiality. Therefore, it is necessary to avoid overlapping of a VLAN among tenants within the same network segment, for example.

Thus, at the time of setting up a tenant network in a data center on demand when generating a virtual machine, issues to be resolved are (1) reduction in the number of networks which execute work and management of equipment which actually generates a virtual machine, (2) realization without using an IP address and (3) coexistence of accessibility and confidentiality in a tenant network in a data center.

Issues to be resolved in the service of lending a thin client environment not considered in the Patent Literature 1 and the Patent Literature 2 are (4) the need of facilitating expansion of a hypervisor in a data center when a hypervisor in which a virtual machine is to be generated runs short and (5) the tenant's need of managing a virtual machine by OS information, for example, a domain suffix, at the time of using the service.

OBJECT OF THE INVENTION

An object of the present invention is to resolve the above-described issues and provide a thin client environment providing system which structures a VLAN on demand when adding a virtual machine in service of lending a thin client environment to a tenant (an organization unit such as a corporation), a server, a thin client environment management method and a thin client environment management program.

SUMMARY

According to a first exemplary aspect of the invention, a thin client environment providing system, includes
a data center including at least one hypervisor and at least one layer 2 switch,
a server, and
at least one terminal computer,
wherein the server includes
a VLAN group reservation unit which when receiving, from the terminal computer, a virtual machine addition request including information of a tenant, information of a virtual OS and information of a generation destination hypervisor, obtains, from a data center DB which stores information of the hypervisor, information of a hypervisor group and information of the layer 2 switch so as to be correlated with each other, the information of the hypervisor group and the information of the layer 2 switch corresponding to the generation destination hypervisor, extracts, from a tenant DB which stores information of the tenant, information of the hypervisor group, information of a VLAN group and information of the virtual OS so as to be correlated with each other, the VLAN group corresponding to the information of the hypervisor group obtained from the data center DB, and the information of the tenant and information of the OS included in the virtual machine addition request, and when no relevant VLAN group exists, indexes a new VLAN group and registers the indexed VLAN group with the tenant DB to reserve the VLAN group, and a VLAN structure instructing unit which, when none of the VLAN group extracted or registered by the VLAN group reservation unit is registered with a switch DB which stores information of the layer 2 switch and information of the VLAN group so as to be correlated with each other, registers the information of the layer 2 switch and the information of the VLAN group so as to be correlated with each other, as well as transmitting a request for structuring the VLAN by the VLAN group to the data center.

According to a second exemplary aspect of the invention, a server of a thin client environment providing system including a data center including at least one hypervisor and at least one layer 2 switch, the server, and at least one terminal computer, includes
a VLAN group reservation unit which when receiving, from the terminal computer, a virtual machine addition request including information of a tenant, information of a virtual OS and information of a generation destination hypervisor, obtains, from a data center DB which stores information of the hypervisor, information of a hypervisor group and information of the layer 2 switch so as to be correlated with each other, the information of the hypervisor group and the information of the layer 2 switch corresponding to the generation destination hypervisor, extracts, from a tenant DB which stores the information of the tenant, the information of the hypervisor group, information of a VLAN group and the information of the virtual OS so as to be correlated with each other, the VLAN group corresponding to the information of the hypervisor group obtained from the data center DB, and the information of the tenant and the information of the OS included in the virtual machine addition request, and when no relevant VLAN group exists, indexes a new VLAN group and registers the indexed VLAN group with the tenant DB to reserve the VLAN group, and a VLAN structure instructing unit which, when none of the VLAN group extracted or registered by the VLAN group reservation unit is registered with a switch DB which stores the information of the layer 2 switch and the information of the VLAN group so as to be correlated with each other, registers the information of the layer 2 switch and the information of the VLAN group so as to be correlated with each other, as well as transmitting a request for structuring the VLAN by the VLAN group to the data center.

According to a third exemplary aspect of the invention, a thin client environment management method in a thin client environment providing system comprising a data center including at least one hypervisor and at least one layer 2 switch, the server, and at least one terminal computer, wherein the server comprises a VLAN group reservation step of, when receiving, from the terminal computer, a virtual machine addition request including information of a tenant, information of a virtual OS and information of a generation destination hypervisor, obtaining, from a data center DB which stores information of the hypervisor, information of a hypervisor group and information of the layer 2 switch so as to be correlated with each other, the information of the hypervisor group and the information of the layer 2 switch corresponding to the generation destination hypervisor, extracting, from a tenant DB which stores the information of the tenant, the information of the hypervisor group, information of a VLAN group and the information of the virtual OS so as to be correlated with each other, the VLAN group corresponding to the information of the hypervisor group obtained from the data center DB, and the information of the tenant and the information of the OS included in the virtual machine addition request, and when no relevant VLAN group exists, indexing a new VLAN group and registering the indexed VLAN group with the tenant DB to reserve the VLAN group, and a VLAN structure instructing step, when none of the VLAN group extracted or registered at the VLAN group reservation step is registered with a switch DB which stores the information of the layer 2 switch and the information of the VLAN group so as to be correlated with each other, of registering the information of the layer 2 switch and the information of the VLAN group so as to be correlated with each other, as well as transmitting a request for structuring the VLAN by the VLAN group to the data center.

According to a fourth exemplary aspect of the invention, a computer-readable storage medium storing a thin client environment management program in a thin client environment providing system comprising a data center including at least one hypervisor and at least one layer 2 switch, a server, and at least one terminal computer, wherein the thin client environment management program causes the server to execute a VLAN group reservation processing, when receiving, from the terminal computer, a virtual machine addition request including information of a tenant, information of a virtual OS and information of a generation destination hypervisor, of obtaining, from a data center DB which stores information of the hypervisor, information of a hypervisor group and information of the layer 2 switch so as to be correlated with each other, the information of the hypervisor group and the information of the layer 2 switch corresponding to the generation destination hypervisor, extracting, from a tenant DB which stores the information of the tenant, the information of the hypervisor group, information of a VLAN group and the information of the virtual OS so as to be correlated with each other, the VLAN group corresponding to the information of the hypervisor group obtained from the data center DB, and the information of the tenant and the information of the OS included in the virtual machine addition request, and when no relevant VLAN group exists, indexing a new VLAN group and registering the indexed VLAN group with the tenant DB to reserve the VLAN group, and a VLAN structure instructing processing, when none of the VLAN group extracted or registered by the VLAN group reservation processing is registered with a switch DB which stores the information of the layer 2 switch and the information of the VLAN group so as to be correlated with each other, of registering the information of the layer 2 switch and the information of the VLAN group so as to be correlated with each other, as well as transmitting a request for structuring the VLAN by the VLAN group to the data center.

The present invention enables a VLAN to be structured on demand at the time of adding a virtual machine.

BRIEF DESCRIPTION OF THE DRAWINGS

FIG. 5 is a diagram showing a structure of a data center DB, a tenant DB, a switch DB and a virtual machine DB according to the first exemplary embodiment;

EXEMPLARY EMBODIMENT

Figure 1:
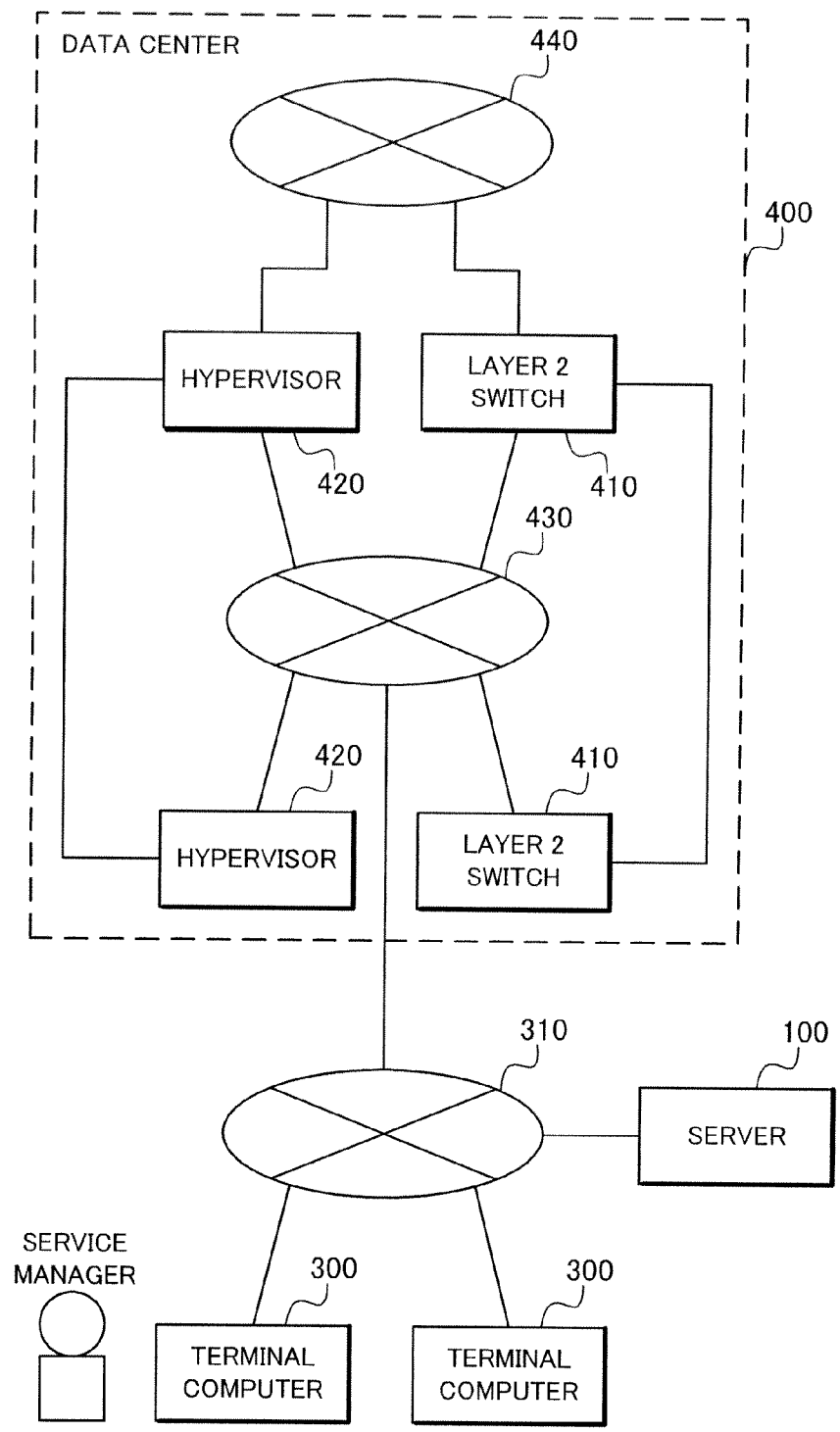
FIG. 1 is a block diagram showing a structure of a thin client environment providing system according to a first exemplary embodiment of the present invention.

The present invention has the following features of:

(1) for the reduction in the number of networks which execute work and management of equipment which actually generates a virtual machine, having a mechanism of structuring a VLAN only for a layer 2 switch corresponding to a hypervisor in which a virtual machine is to be generated, (2) for the realization without using an IP address, having a mechanism of using only a VLAN group and OS information as a parameter which discriminates a network to prevent dependency on a network address, (3) for the coexistence of accessibility and confidentiality in a tenant network in a data center, having a mechanism of using a VLAN and reserving a VLAN group being used by a tenant in a hypervisor group to prevent other tenant from using the VLAN group, (4) for the need of facilitating expansion of a hypervisor in a data center when a hypervisor in which a virtual machine is to be generated runs short, having a mechanism of registering, as a hypervisor group, a combination of a hypervisor and a layer 2 switch to be used, and (5) for the tenant's need of managing a virtual machine by OS information, for example, a domain suffix, at the time of using the service, having a mechanism of obtaining virtual machines in the lump for each OS information.

For clarifying the above-described and other objects, features and advantages of the present invention, exemplary embodiments of the present invention will be detailed in the following with reference to accompanying drawings. Other than the above-described objects of the present invention, other technical problems, means for solving the technical problems and their functions and effects will become apparent from the following disclosure of the exemplary embodiments.

In all the drawings, the same reference numerals are allotted to the same components to appropriately omit their description.

First Exemplary Embodiment

Next, detailed description will be made of a first exemplary embodiment of the present invention with reference to the drawings. In the following drawings, a structure of a part not related to a gist of the present invention will be appropriately omitted and not illustrated.

Figure 2:
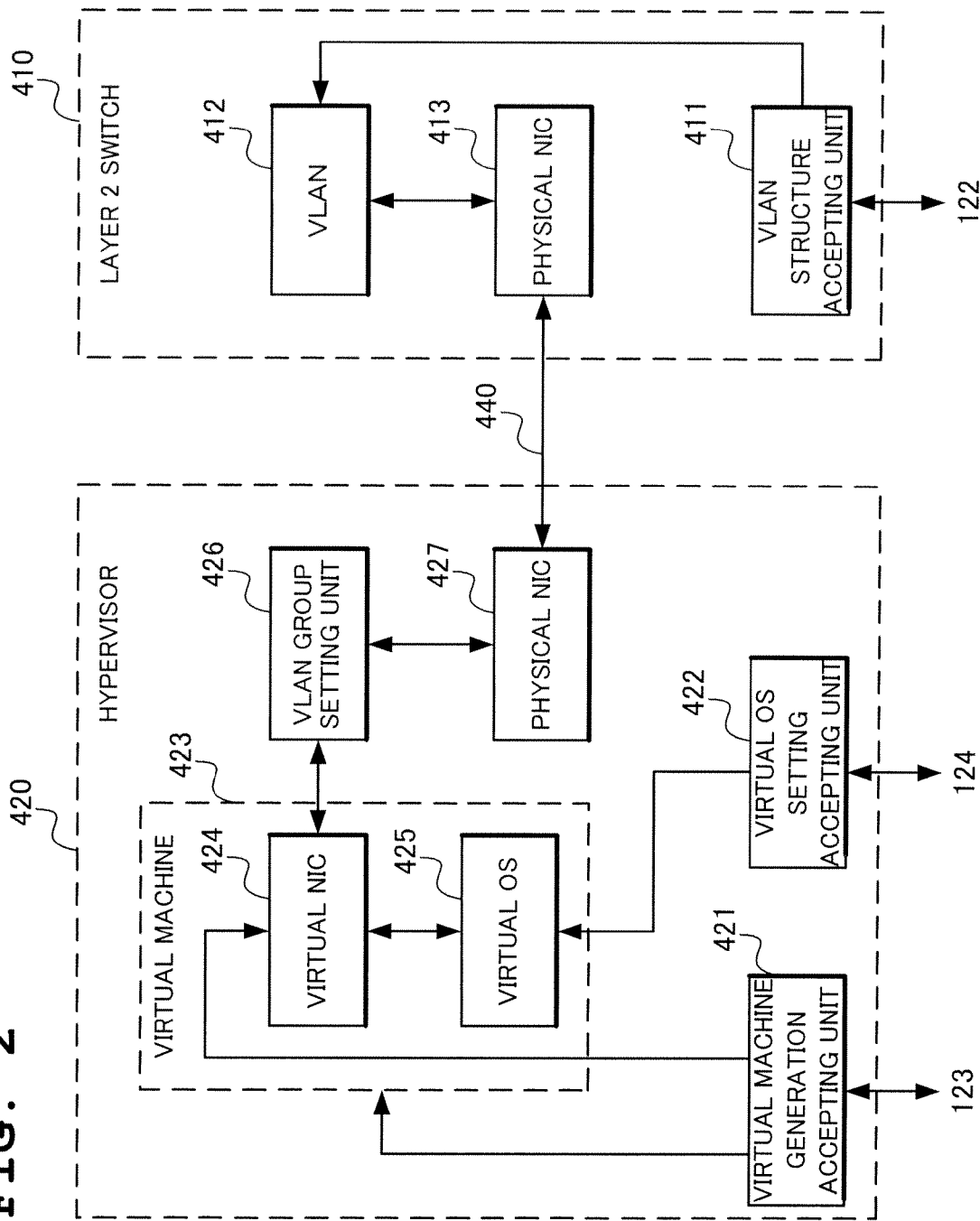
FIG. 2 is a block diagram showing a structure of a data center according to the first exemplary embodiment.

FIG. 2 shows realization of a tenant network 440 in a data center 400 according to the present exemplary embodiment in terms of apparatus, which includes a layer 2 switch 410, a VLAN structure accepting unit 411, a hypervisor 420, a virtual machine generation accepting unit 421 and a virtual OS setting accepting unit 422.

The layer 2 switch 410 has a function of logically dividing a network segment by a VLAN 412.

The VLAN structure accepting unit 411 provides an interface for structuring the VLAN 412 from outside the layer 2 switch 410.

The hypervisor 420 has a function of operating a virtual machine 423.

The virtual machine generation accepting unit 421 provides an interface for structuring the virtual machine 423 from outside the hypervisor 420.

The virtual OS setting accepting unit 422 provides an interface for setting a virtual OS 425 from outside the hypervisor 420.

Figure 3:
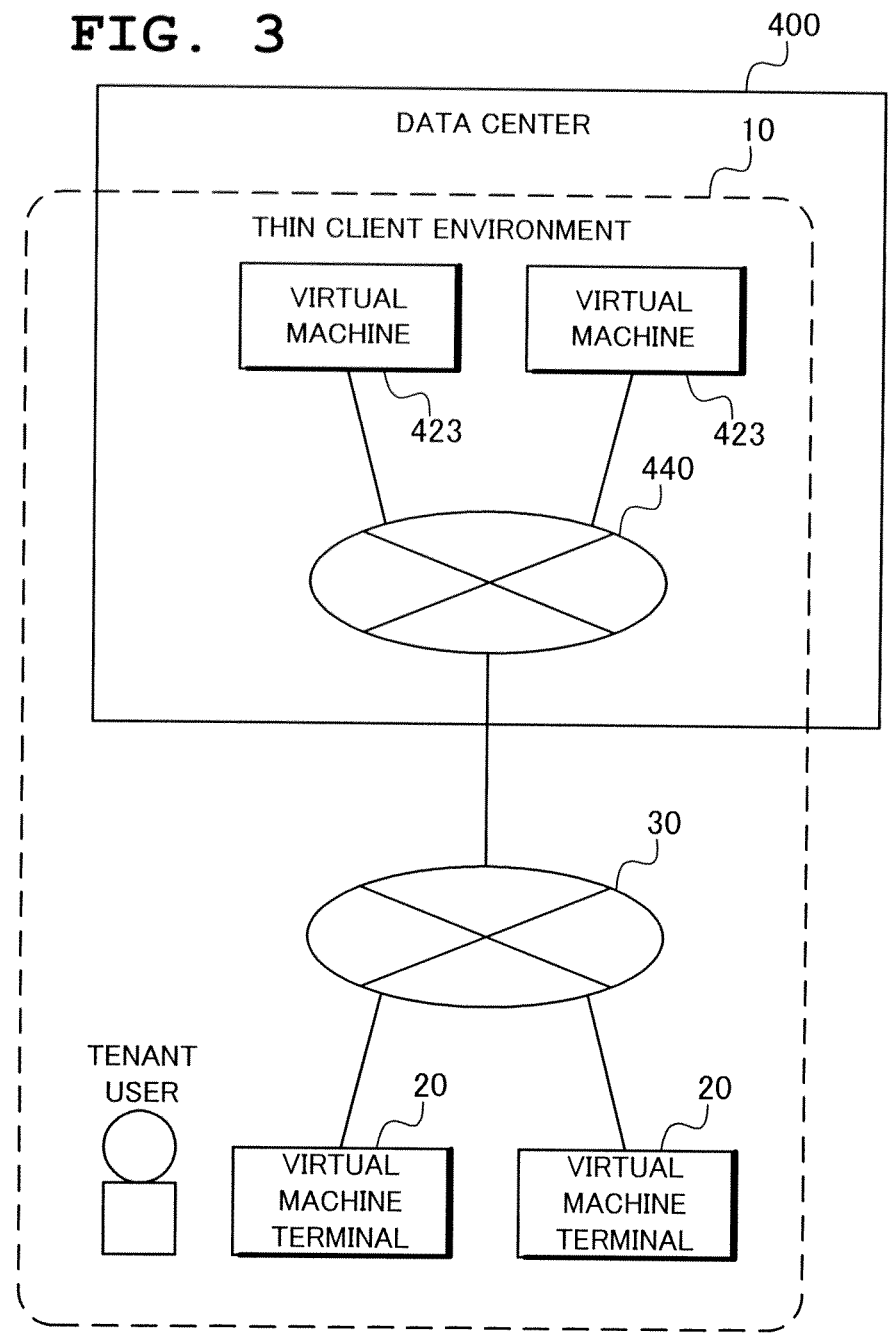
FIG. 3 is a block diagram showing a structure of a thin client environment according to the first exemplary embodiment.
Figure 16:
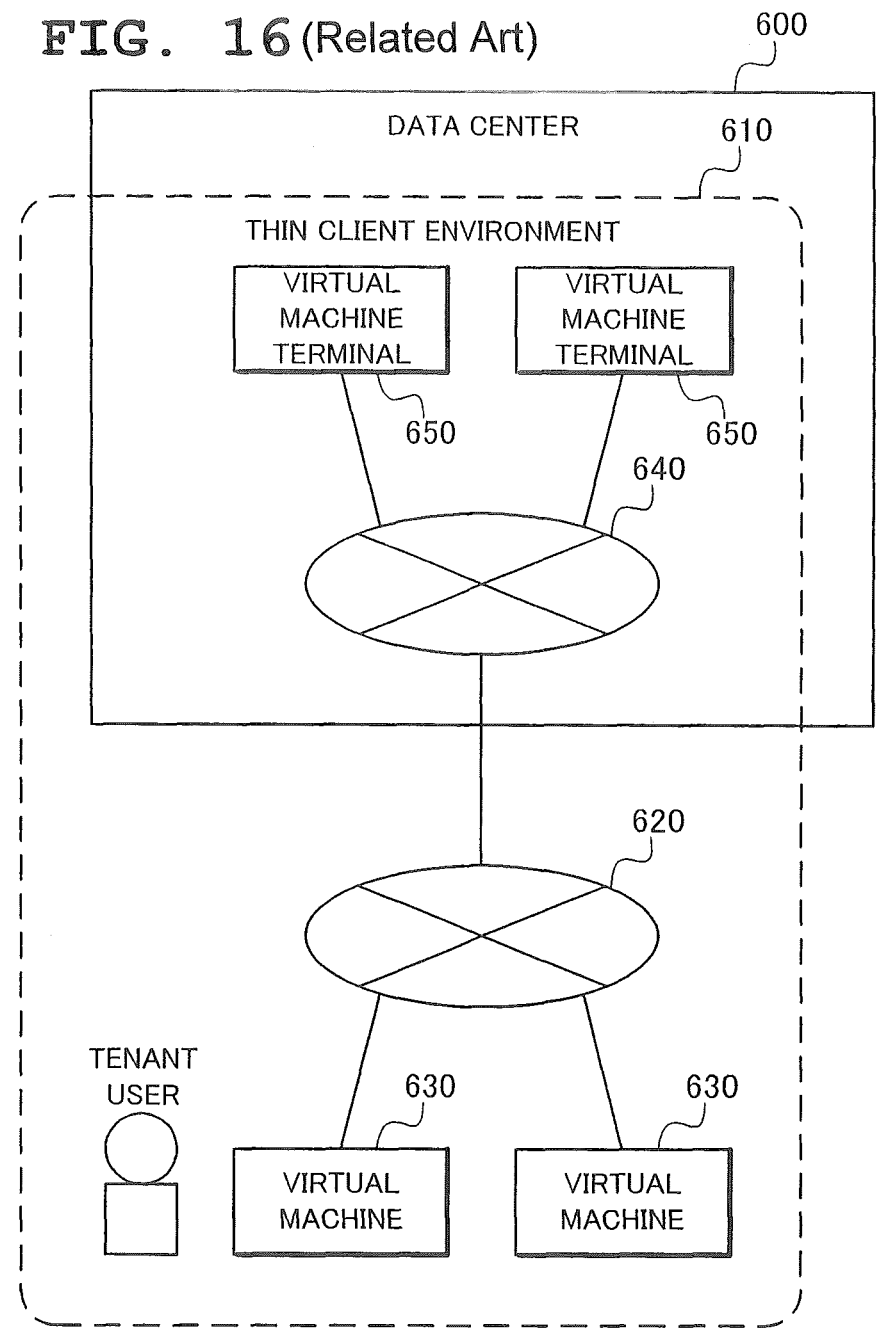
FIG. 16 is a block diagram showing a structure of a thin client environment according to the background art.
Figure 17:
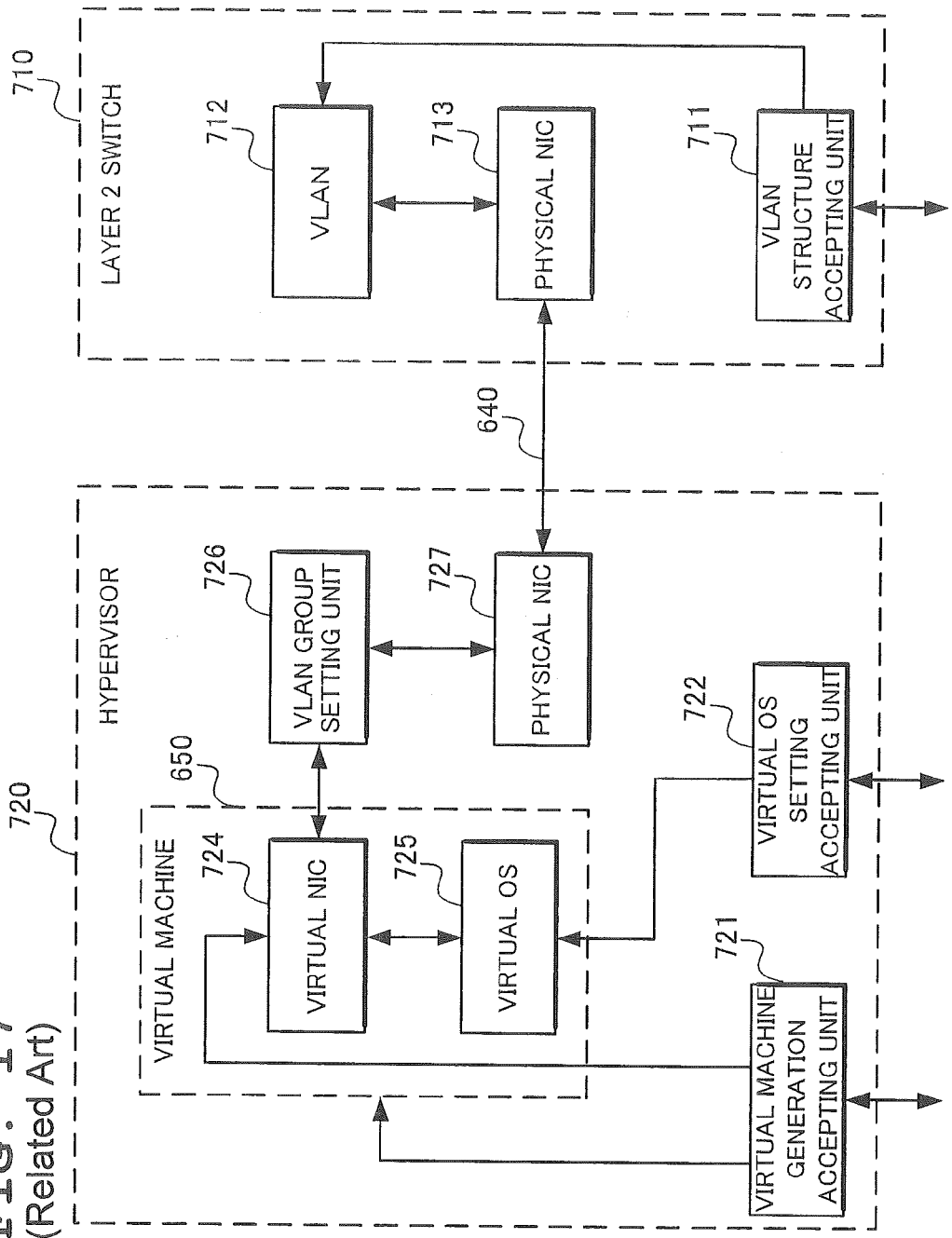
FIG. 17 is a block diagram showing a structure of a data center according to the background art.

FIG. 3 is a block diagram showing a structure of a thin client environment 10 provided by the present invention. Since a structure of the thin client environment 10 and a function of each part are the same as those of the thin client environment 610 according to the background art shown in FIG. 16, no detailed description will be made thereof.

FIG. 1 is a block diagram showing an entire structure of a thin client environment providing system 1000 according to the present exemplary embodiment which realizes service of lending the thin client environment 10 shown in FIG. 3.

The thin client environment providing system 1000 comprises the data center 400, a server 100 located outside the data center 400 for managing the thin client environment 10, and a plurality of terminal computers 300 for a service manager to connect to the server 100.

In the data center 400, the layer 2 switch 410 operates as an apparatus which realizes the thin client environment 10 and the hypervisor 420 operates on a real calculating machine. The layer 2 switch 410 and the hypervisor 420 are connected by such a network as the Ethernet.

As shown in FIG. 2, the layer 2 switch 410 forms the VLAN 412 and provides the tenant network 440 in a data center which connects the virtual machines 423 for use in the thin client environment 10.

Figure 6:
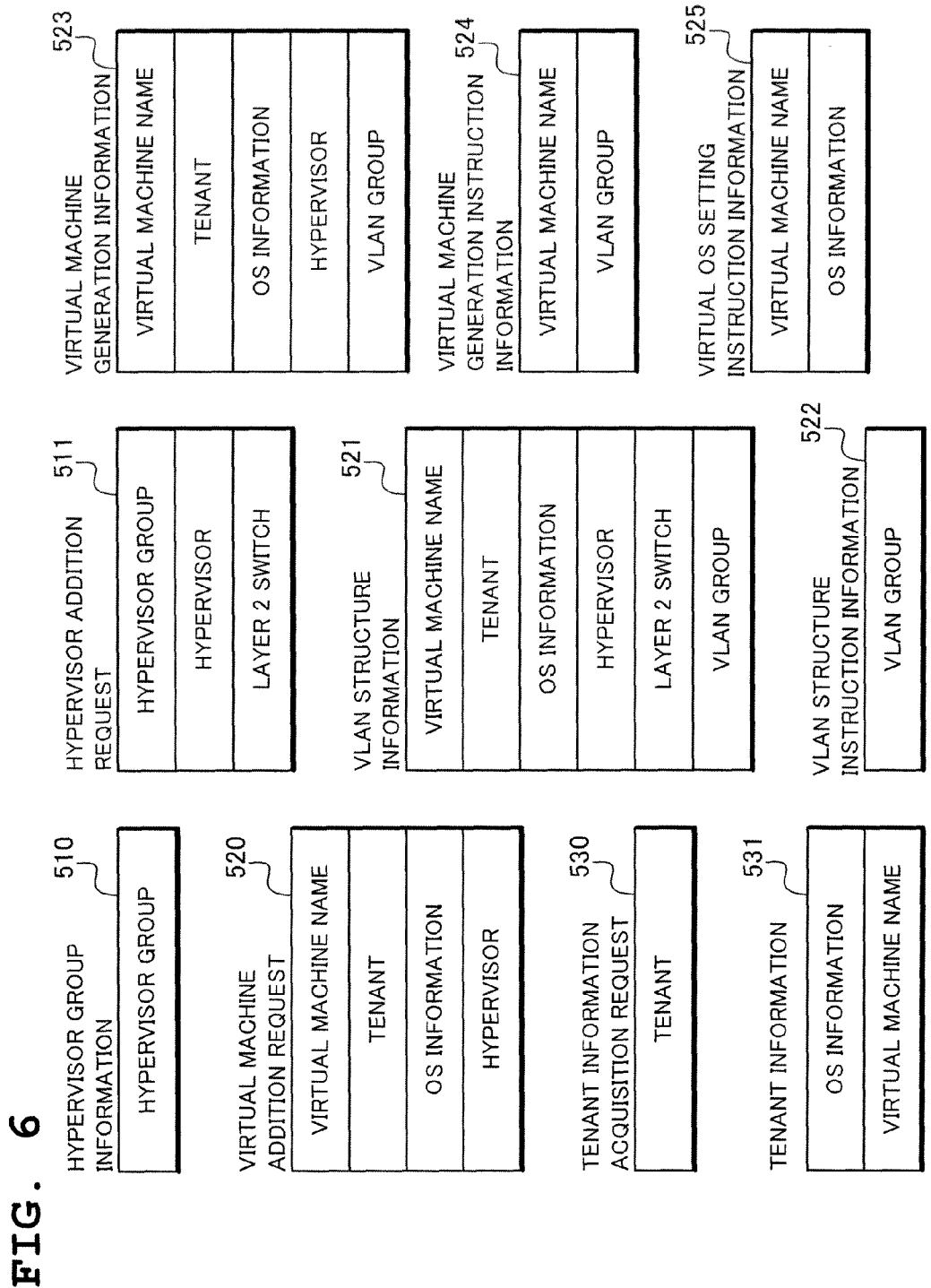
FIG. 6 is a diagram showing a structure of information to be handled in the first exemplary embodiment.

The VLAN structure accepting unit 411 of the layer 2 switch 410 executes VLAN structuring processing (Step S246 in FIG. 11) of receiving VLAN structure instruction information 522 (FIG. 6), structuring the VLAN 412 and transmitting processing completion to a calling source.

The hypervisor 420 provides operation of the virtual machine 423 in the thin client environment 10.

The virtual machine generation accepting unit 421 of the hypervisor 420 executes virtual machine generation processing (Step S253 in FIG. 12) of receiving virtual machine generation instruction information 524 (FIG. 6), generating the virtual machine 423, setting a VLAN group at a virtual NIC 424 of the virtual machine 423 and transmitting processing completion to a calling source.

The virtual OS setting accepting unit 422 executes virtual OS setting processing (Step S263 in FIG. 13) of receiving virtual OS setting instruction information 525 (FIG. 6), setting the virtual OS 425 of the virtual machine 423 and transmitting processing completion to a calling source.

The server 100, a real calculating machine or a virtual calculating machine at least having a CPU and a memory, is connected to a management network 430 in a data center and to the terminal computer 300 via a management network 310.

The server 100 also receives a hypervisor group acquisition request from the terminal computer 300 and transmits hypervisor group information 510 (FIG. 6) to the terminal computer 300.

The server 100 also receives a hypervisor addition request 511 (FIG. 6) from the terminal computer 300.

The server 100 receives a virtual machine addition request 520 from the terminal computer 300 (FIG. 6), connects to the layer 2 switch 410 via the management network 310 and the management network 430 in a data center to transmit the VLAN structure instruction information 522 (FIG. 6) and transmits the virtual machine generation instruction information 524 (FIG. 6) and virtual OS setting instruction information 525 (FIG. 6) to the hypervisor 400 via the management network 310 and the management network 430 in a data center.

The server 100 receives a tenant information acquisition request 530 (FIG. 6) from the terminal computer 300 to transmit tenant information 531 (FIG. 6) to the terminal computer 300.

The terminal computer 300 is a real calculating machine or a virtual calculating machine having at least a CPU, a memory, an input device such as a mouse or a keyboard and an output device such as a display.

The terminal computer 300 receives the hypervisor group information 510 (FIG. 6) from the server 100 to transmit the hypervisor addition request 511 (FIG. 6) to the server 100.

The terminal computer 300 also transmits the virtual machine addition request 520 (FIG. 6) to the server 100 and transmits the tenant information acquisition request 530 (FIG. 6) to the server 100 to receive the tenant information 531 (FIG. 6) from the server 100.

Figure 4:
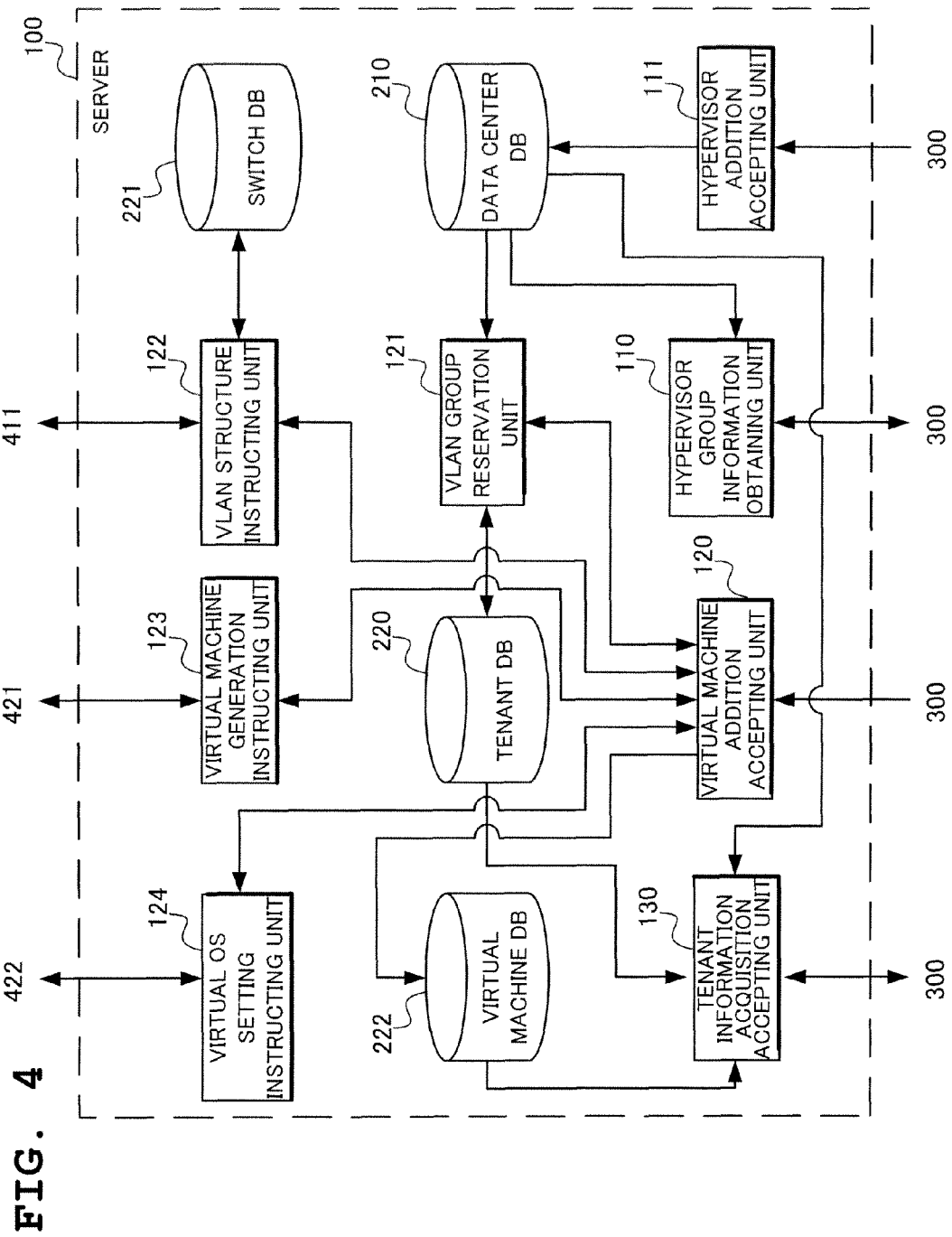
FIG. 4 is a block diagram showing a structure of a server according to the first exemplary embodiment.

FIG. 4 is a block diagram showing an internal structure of the server 100.

The server 100 includes, as a DB (data base), a data center DB 210, a tenant DB 220, a switch DB 221 and a virtual machine DB 222.

The data center DB 210 manages information about a combination between the hypervisor 420 and the layer 2 switch 410 managed by the data center 400.

The tenant DB 220 manages information about a VLAN group reserved for a tenant in the hypervisor group.

The switch DB 221 manages information of the VLAN 412 structured on the layer 2 switch 410 on a VLAN group basis.

The virtual machine DB 222 manages information of the virtual machine 423 operable on the hypervisor 420.

Structure of each DB is here shown in FIG. 5.

The server 100 includes, as a function block, a hypervisor group information obtaining unit 110 for use in hypervisor expansion processing, a hypervisor addition accepting unit 111, a virtual machine addition accepting unit 120 for use in virtual machine addition processing, a VLAN group reservation unit 121, a VLAN structure instructing unit 122, a virtual machine generation instructing unit 123, a virtual OS setting instructing unit 124 and a tenant information acquisition accepting unit 130 for use in tenant information acquisition processing. The function block uses the information shown in FIG. 6 to execute the processing shown in FIG. 7 through FIG. 14.

Record to be handled by the data center DB 210 is shown in FIG. 5. The hypervisor group uses data whose value is unique in the server 100, for example, an integral number sequentially indexed in an ascending order from 0 and the hypervisor and the layer 2 switch use data whose value is unique that enables discrimination of an entity of a network interface layer of a TCP/IP protocol suite, for example, MAC address data when the Ethernet is mounted.

Record to be handled by the tenant DB 220 is shown in FIG. 5. The tenant uses data whose value is unique in the server 100, for example, character string data of a corporation name which concluded a contract for lending service. The hypervisor group has a value indicated in the data center DB 210. The VLAN group uses numerical value data whose value is used when structuring the VLAN 412 by the layer 2 switch 410, for example, numbers not less than 1 and not more than 4095 as a VLAN ID when using a tag VLAN. OS information uses a value which is set at the virtual OS 425 that enables discrimination of an entity of an application layer of a TCP/IP protocol suite for the virtual machine 423 in the thin client environment, for example, character string data with a DNS server IP address added after a domain suffix.

Record to be handled by the switch DB 221 is shown in FIG. 5. The layer 2 switch has a value to be indicated in the data center DB 210 and the VLAN group has a value to be indicated in the tenant DB 220.

Record to be handled by the virtual machine DB 222 is shown in FIG. 5. The tenant has a value to be indicated in the tenant DB 220, the hypervisor has a value to be indicated in the data center DB 210 and the virtual machine name uses a value that enables the hypervisor 420 to handle the virtual machine 423 uniquely, for example, character string data of half-width alphanumeric characters.

Description of Operation of First Exemplary Embodiment

Next, operation of the thin client environment providing system 1000 according to the present exemplary embodiment will be detailed with reference to the drawings.

In the present exemplary embodiment, executable are roughly hypervisor expansion processing, virtual machine addition processing and tenant information acquisition processing.

The server 100 first executes operation of registering a hypervisor in which a virtual machine is to be generated in hypervisor expansion processing, upon registration of the hypervisor, structuring a VLAN by the virtual machine addition processing and then generating a virtual machine on the hypervisor and upon generation of the virtual machine, obtaining virtual machine information for each OS information by the tenant information acquisition processing.

(Description of Operation of Hypervisor Expansion Processing)

The hypervisor expansion processing includes the following operation. The hypervisor group information obtaining unit 110 transmits the hypervisor group information 510 to the terminal computer 300. The hypervisor addition accepting unit 111 receives the hypervisor addition request 511 from the terminal computer 300 and adds the same to the data center DB 210.

Hypervisor group of the hypervisor addition request 511 is data selected by a service manager through the input device of the terminal computer 300 from those obtained by using the hypervisor group information obtaining unit 110 of the server 100.

The hypervisor 420 and the layer 2 switch 410 are data input by the service manager through the input device of the terminal computer 300.

The hypervisor expansion processing realizes a mechanism (the feature (4) of the present invention) of first obtaining a list of hypervisor groups by the "hypervisor group information obtaining" processing and then adding the hypervisor group obtained by the "hypervisor addition" processing, a hypervisor to be expanded and its corresponding layer 2 switch to register, as a hypervisor group, the combination of the hypervisor and the layer 2 switch to be used, as well as resolving the issue (the issue (4)) that when a hypervisor in which a virtual machine is to be generated runs short, expansion of a hypervisor in the data center should be easy.

In the hypervisor expansion processing, the "hypervisor group information obtaining" processing is first executed. Operation of the processing proceeds according to the flow of FIG. 7 by using the hypervisor group information obtaining unit 110.

Figure 7:
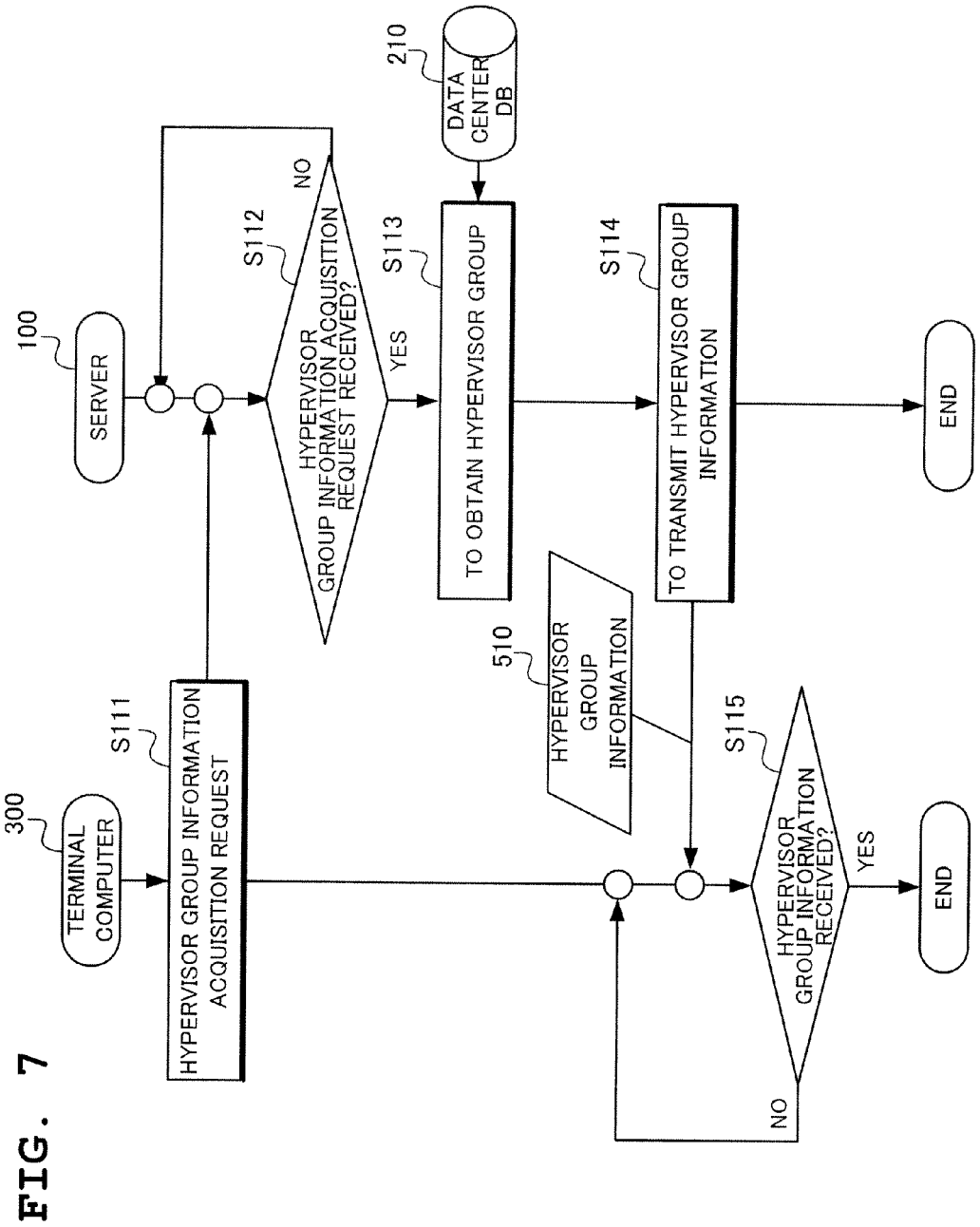
FIG. 7 is a flow chart showing operation of processing of obtaining hypervisor group information according to the first exemplary embodiment.

With reference to FIG. 7, the terminal computer 300 first transmits the hypervisor group information acquisition request to the server 100 (Step S111) to wait until receiving the hypervisor group information 510 from the server 100 (Step S115).

The server 100 waits until receiving the hypervisor group information acquisition request from the terminal computer 300 (Step S112) and when receiving the hypervisor group information acquisition request ("YES" at Step S112), the hypervisor group information obtaining unit 110 reads the data center DB 210 to obtain a hypervisor group (Step S113).

On this occasion, the hypervisor group information obtaining unit 110 reads only a column of the hypervisor group from all the records of the data center DB 210 and deletes an overlapping record to obtain the hypervisor group information 510.

The hypervisor group information obtaining unit 110 then transmits the hypervisor group information 510 to the terminal computer 300 (Step S114).

Next, execute the "hypervisor addition" processing by using the obtained hypervisor group. Operation of this processing proceeds according to the flow shown in FIG. 8 by using the hypervisor addition accepting unit 111.

Figure 8:
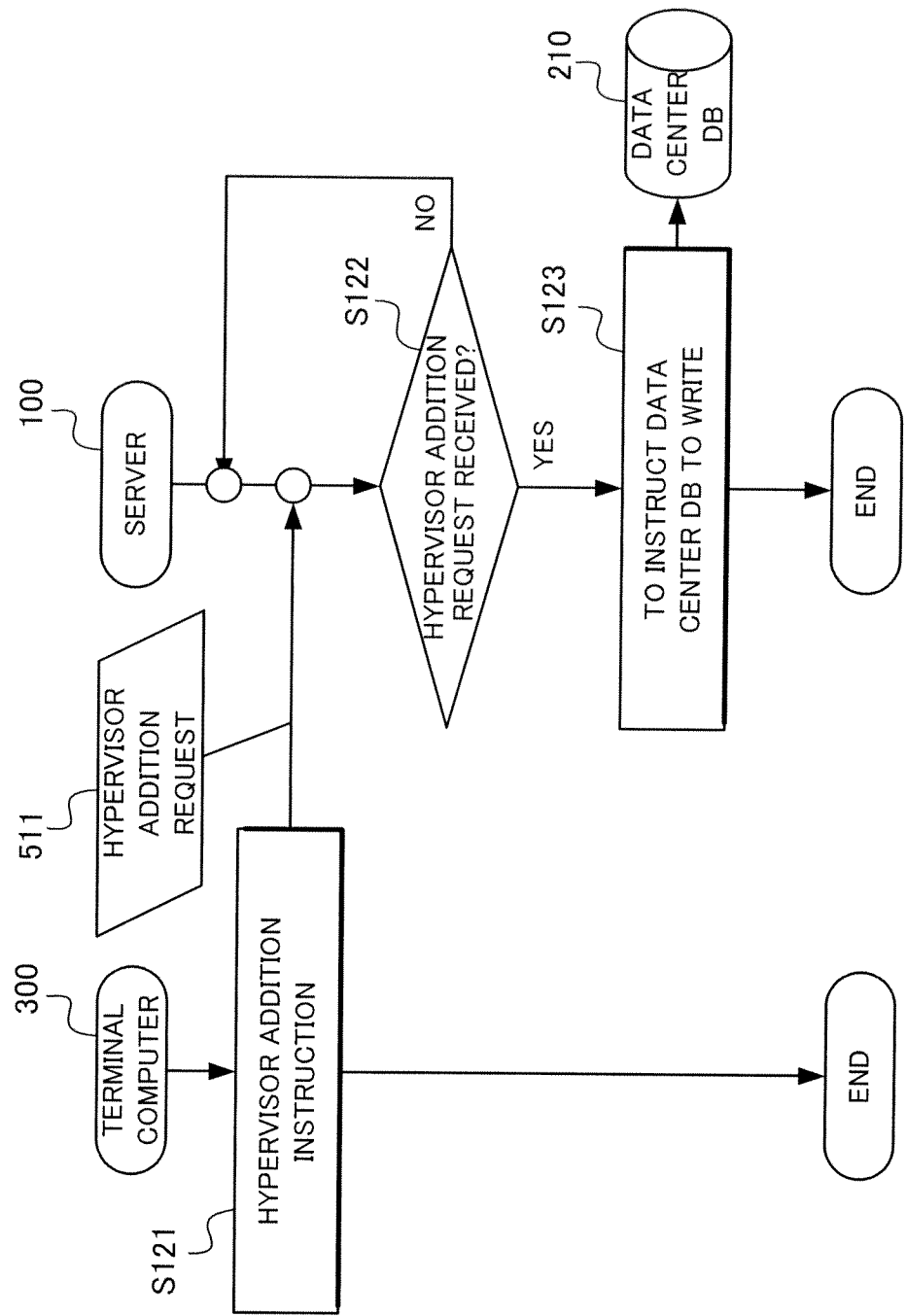
FIG. 8 is a flow chart showing operation of processing of adding a hypervisor according to the first exemplary embodiment.

With reference to FIG. 8, first the terminal computer 300 transmits the hypervisor addition request 511 to the server 100 (Step S121).

The server 100 waits until receiving the hypervisor addition request 511 from the terminal computer 300 (Step S122) and when receiving the hypervisor addition request 511 ("YES" at Step S122), the hypervisor addition accepting unit 111 instructs the data center DB 210 to write records of the hypervisor group, the hypervisor and the layer 2 switch (Step S123).

(Description of Operation of Virtual Machine Addition Processing)

Virtual machine addition processing includes the following operation. The virtual machine addition accepting unit 120 receives the virtual machine addition request 520 from the terminal computer 300, reserves a VLAN group by using the VLAN group reservation unit 121, structures the VLAN 412 in the layer 2 switch 410 by using the VLAN structure instructing unit 122, generates the virtual machine 423 in the hypervisor 420 by using the virtual machine generation instructing unit 123 and the virtual OS setting instructing unit 124, sets the same in the virtual OS 425 and adds the same to the virtual machine DB 222.

Virtual machine name, a tenant, OS information and a hypervisor of the virtual machine addition request 520 are data input by the service manager through the input device of the terminal computer 300.

The virtual machine addition processing includes, first, reception of a virtual machine addition request in the "virtual machine addition request reception" processing. Executed are secondly indexing a VLAN group to be used by a tenant in a hypervisor group by the "VLAN group reservation" processing, thirdly structuring a VLAN in a layer 2 switch corresponding to a hypervisor in which a virtual machine is to be generated in the "VLAN structuring" processing, fourthly generating the virtual machine on the hypervisor by the "virtual machine generation" processing, fifthly setting virtual OS on the virtual machine by the "virtual OS setting" processing and sixthly executing the "virtual machine DB addition" processing.

The second "VLAN group reservation" processing realizes the mechanism of using a VLAN and reserving a VLAN group being used by a tenant in a hypervisor group to prevent other tenant from using the group (the feature (3) of the present invention) and resolves the issue of coexistence of accessibility and confidentiality in a tenant network in a data center (the issue (3)).

The third "VLAN structuring" processing realizes the mechanism of structuring a VLAN only for a layer 2 switch corresponding to a hypervisor in which a virtual machine is to be generated (the feature (1) of the present invention) and resolves the issue of reduction in the number of networks which execute work and management of equipment which actually generates a virtual machine (the issue (1)).

Handling OS information as a parameter for discriminating a network in the first "virtual machine addition request reception" processing and the fifth "virtual OS setting" processing, and handling a VLAN group as a parameter for discriminating a network in the second "VLAN group reservation" processing, the third "VLAN structuring" processing and the fourth "virtual machine generation" processing realizes the mechanism of using only a VLAN group and OS information as a parameter which discriminates a network to prevent dependency on a network address (the feature (2) of the present invention) and resolves the issue of realization without using an IP address (the issue (2)).

Figure 9:
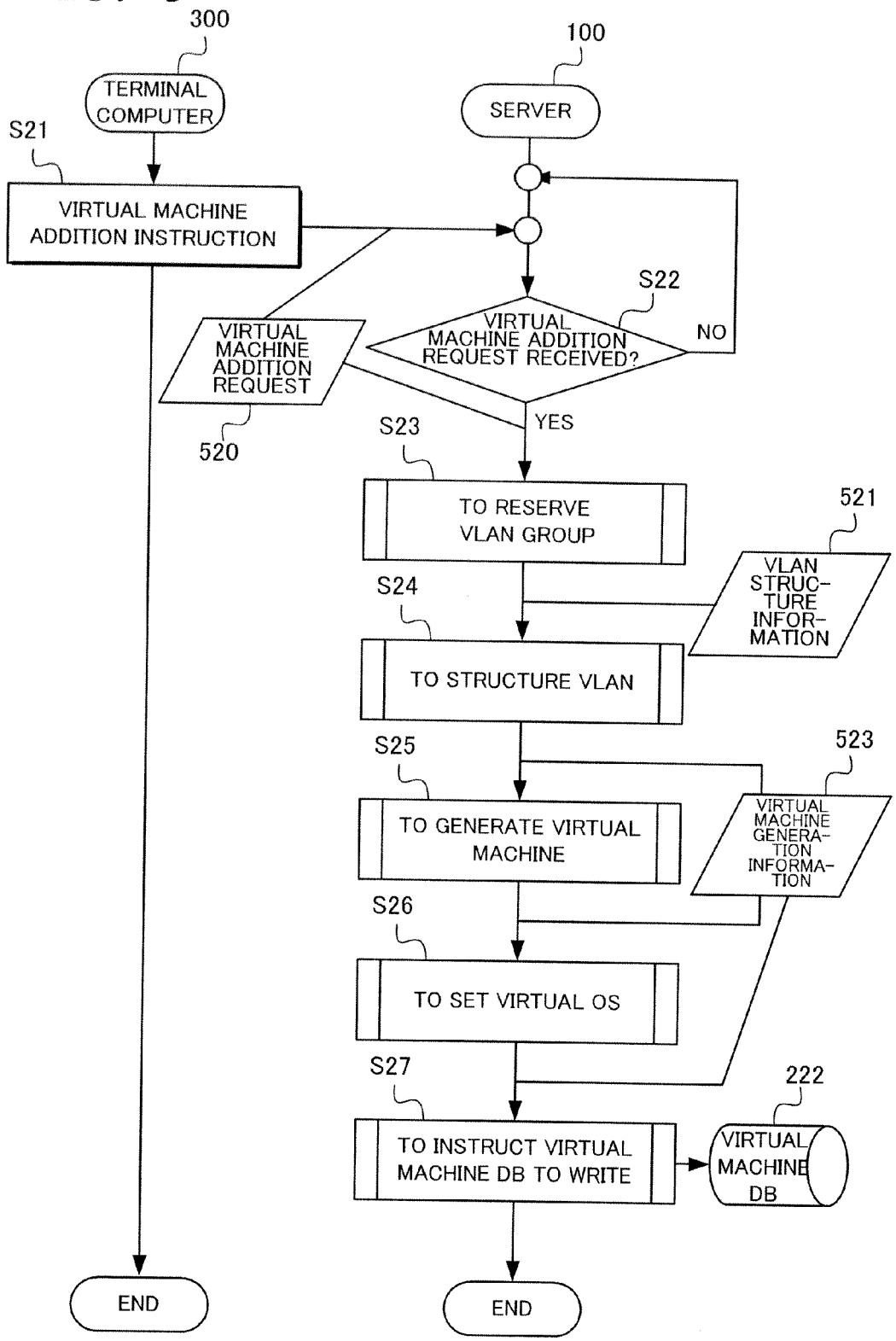
FIG. 9 is a flow chart showing operation of a series of virtual machine addition processing according to the first exemplary embodiment.

A series of processing of the virtual machine addition processing proceeds according to the flow shown in FIG. 9 by using the virtual machine addition accepting unit 120.

With reference to FIG. 9, first, the terminal computer 300 transmits the virtual machine addition request 520 to the server 100 (Step S21).

The server 100 first waits for reception of the virtual machine addition request 520 from the terminal computer 300 as the first "virtual machine addition request reception" processing (Step S22).

In the server 100, when receiving the virtual machine addition request 520, the VLAN group reservation unit 121 obtains VLAN structure information 521 as the second "VLAN group reservation" processing (Step S23).

Next, as the third "VLAN structuring" processing, the VLAN structure instructing unit 122 structures a VLAN in the VLAN 412 of the layer 2 switch 410 to obtain virtual machine generation information 523 (Step S24).

Next, as the fourth "virtual machine generation" processing, the virtual machine generation instructing unit 123 generates the virtual machine 423 in the hypervisor 420 (Step S25).

Next, as the fifth "virtual OS setting" processing, the virtual OS setting instructing unit 124 sets the virtual OS 425 of the virtual machine 423 (Step S26).

Lastly, as the sixth "virtual machine DB addition" processing, the virtual machine addition accepting unit 120 instructs the virtual machine DB 222 to write a record of a tenant, a hypervisor and a virtual machine name (Step S27).

Figure 10:
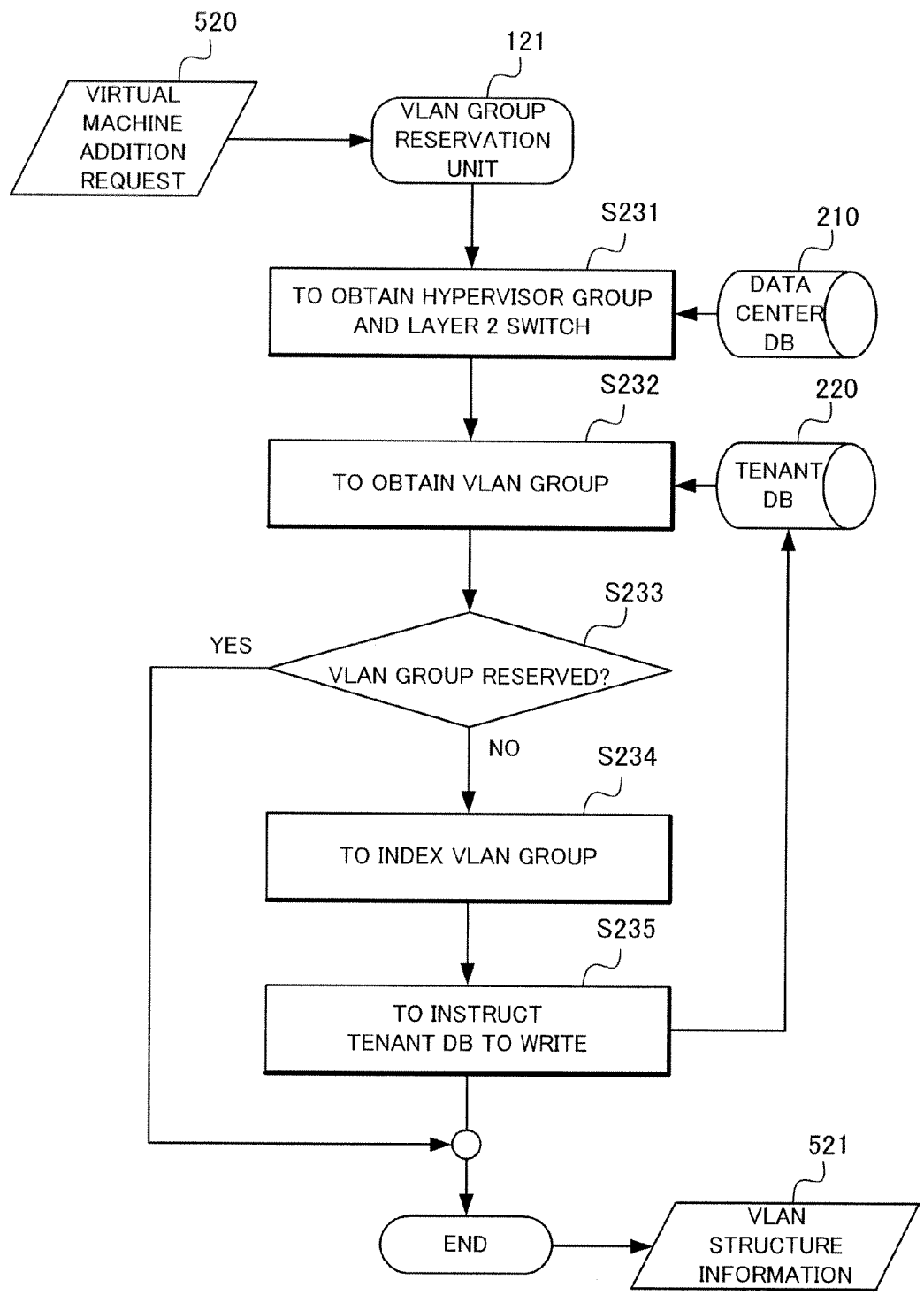
FIG. 10 is a flow chart showing operation of VLAN group reservation processing according to the first exemplary embodiment.

The "VLAN group reservation" processing (Step S23) proceeds according to the flow shown in FIG. 10 by using the VLAN group reservation unit 121.

With reference to FIG. 10, first, with the virtual machine addition request 520 as an input, the VLAN group reservation unit 121 obtains a hypervisor group and a layer 2 switch corresponding to a hypervisor designated by the virtual machine addition request 520 from the data center DB 210 (Step S231).

Next, the VLAN group reservation unit 121 obtains a VLAN group corresponding to the hypervisor group, and the tenant and the OS information of the virtual machine addition request 520 from the tenant DB 220 (Step S232).

Next, the VLAN group reservation unit 121 checks whether the VLAN group is already reserved or not (Step S233) and when the VLAN group is already reserved, outputs the VLAN structure information 521 and when the same is yet to be reserved, indexes the VLAN group (Step S234).

In indexing the VLAN group (Step S234), the VLAN group reservation unit 121 obtains all the VLAN groups of the target hypervisor group from the tenant DB 220 and indexes a group which is closest to an initial value among those not indexed. In a case, for example, where a VLAN group is mounted by a tag VLAN, an initial value of the tag VLAN is a VLAN ID1 and the VLAN ID1 and a VLAN ID2 are indexed, the VLAN group reservation unit 121 indexes a VLAN ID3.

Next, the VLAN group reservation unit 121 gives a write instruction to the tenant DB 220 (Step S235) to output the VLAN structure information 521 including the virtual machine name, the tenant, the OS information, the hypervisor, the layer 2 switch and the VLAN group.

Figure 11:
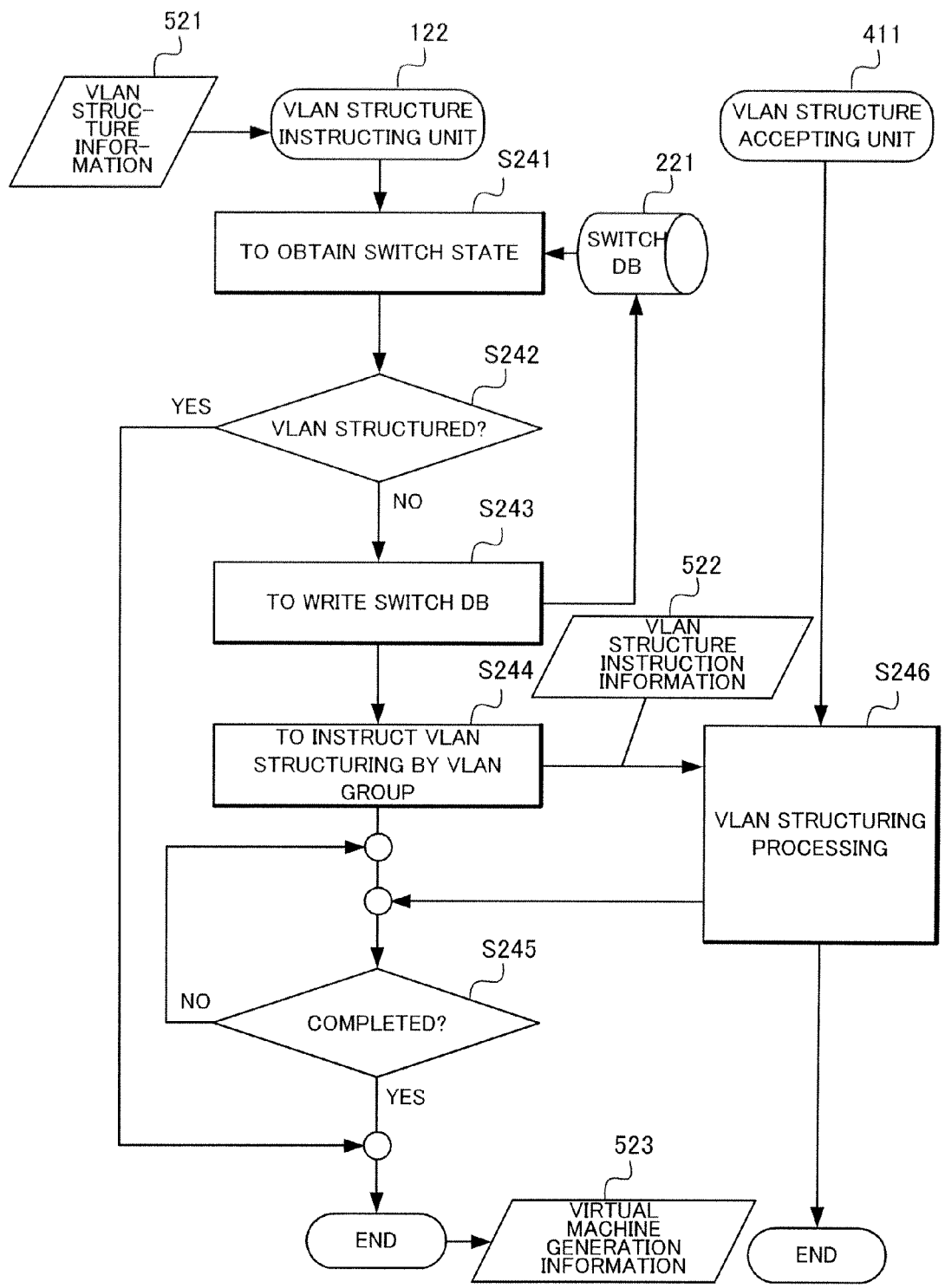
FIG. 11 is a flow chart showing operation of VLAN structuring processing according to the first exemplary embodiment.

The "VLAN structure" processing (Step S24) proceeds according to the flow of FIG. 11 by using the VLAN structure instructing unit 122.

With reference to FIG. 11, first, with the VLAN structure information 521 as an input, the VLAN structure instructing unit 122 obtains a VLAN group corresponding to the layer 2 switch 410 of the VLAN structure information 521 from the switch DB 221 (Step S241).

Next, the VLAN structure instructing unit 122 checks whether the VLAN is already structured or not (whether the VLAN group is obtained at Step S241) (Step S242) and when the VLAN is already structured, outputs the virtual machine generation information 523 and when no VLAN is to be structured, gives a write instruction to the switch DB 221 (Step S243).

Next, the VLAN structure instructing unit 122 transmits the VLAN structure instruction information 522 including the VLAN group to the VLAN structure accepting unit 411 of the layer 2 switch 410 indicated by the VLAN structure information 521 (Step S244) to wait for reception of processing completion from the VLAN structure accepting unit 411 of the layer 2 switch 410 (Step S245).

Upon receiving the processing completion from the VLAN structure accepting unit 411 of the layer 2 switch 410 ("YES" at Step S245), the VLAN structure instructing unit 122 outputs the virtual machine generation information 523 including the virtual machine name, the tenant, the OS information, the hypervisor and the VLAN group.

Figure 12:
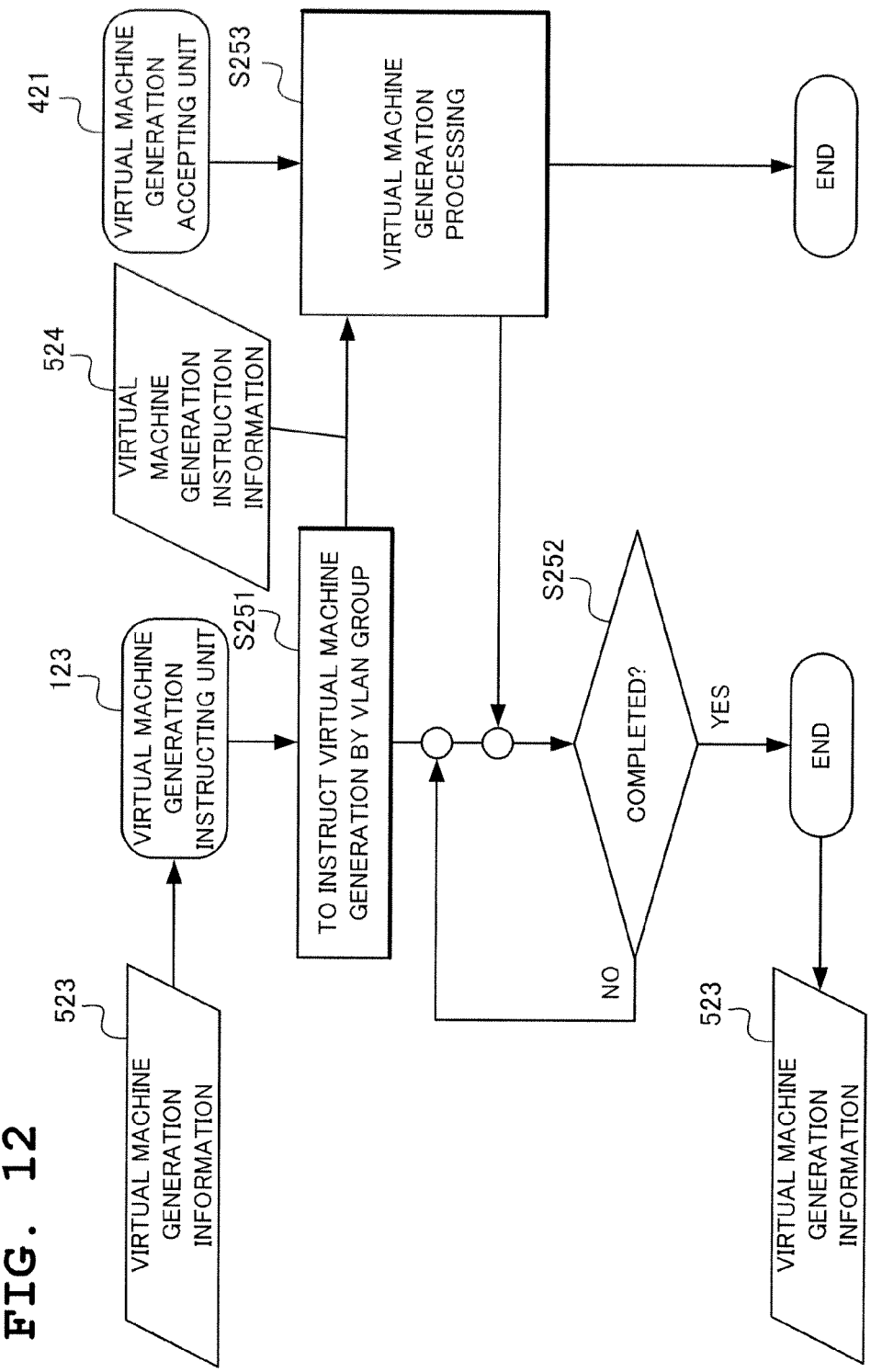
FIG. 12 is a flow chart showing operation of virtual machine generation processing according to the first exemplary embodiment.

The "virtual machine generation" processing (Step S25) proceeds according to the flow shown in FIG. 12 by using the virtual machine generation instructing unit 123.

With reference to FIG. 12, first, with the virtual machine generation information 523 as an input, transmit the virtual machine generation instruction information 524 including a virtual machine name and a VLAN group to the virtual machine generation accepting unit 421 of the hypervisor 420 indicated by the virtual machine generation information 523 (Step S251) and wait for the reception of processing completion from the virtual machine generation accepting unit 421 of the hypervisor 420 (Step S252) to output the virtual machine generation information 523.

Figure 13:
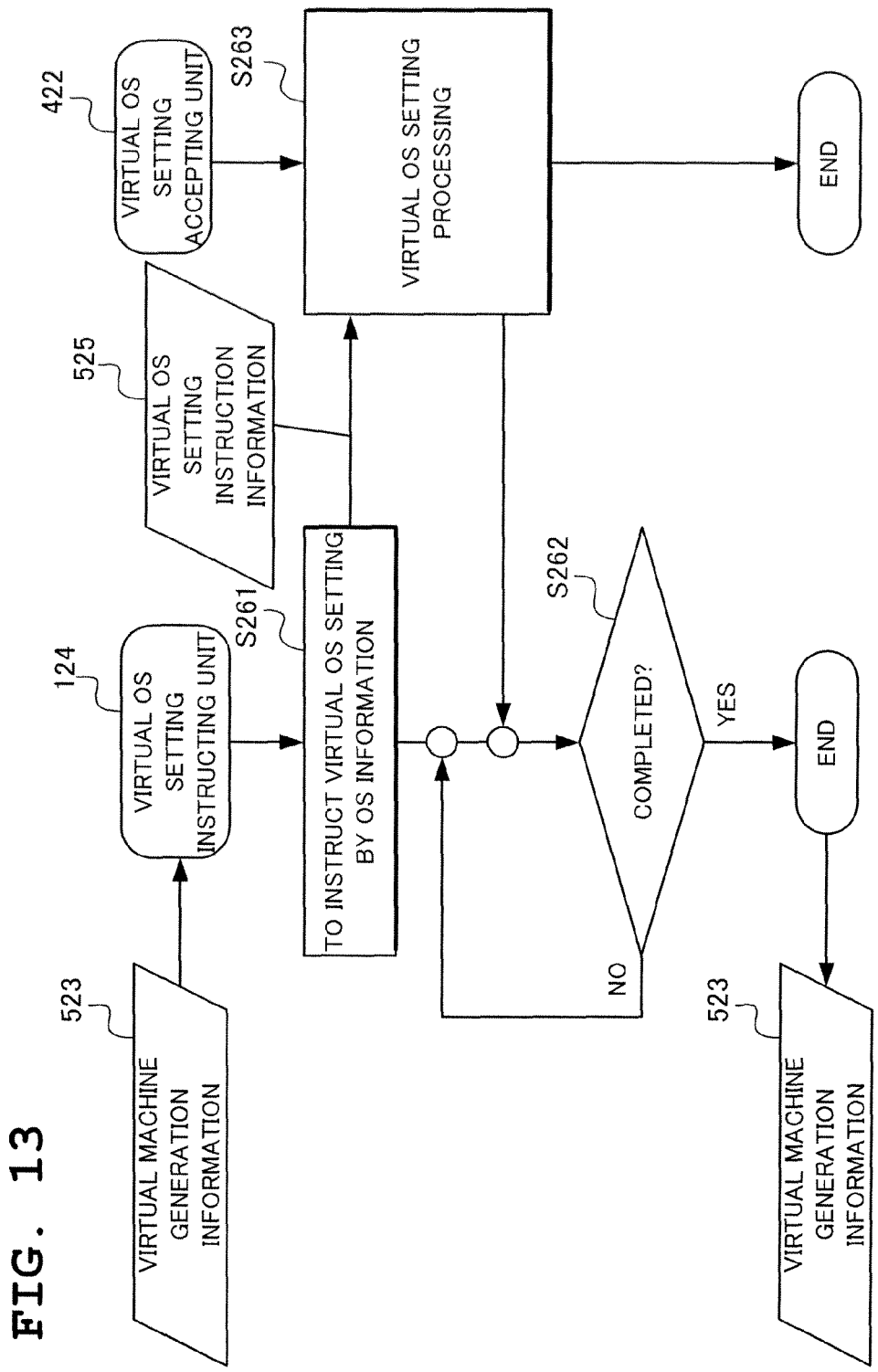
FIG. 13 is a flow chart showing operation of virtual OS setting processing according to the first exemplary embodiment.

The "virtual OS setting" processing (Step S26) proceeds according to the flow shown in FIG. 13 by using the virtual OS setting instructing unit 124.

With reference to FIG. 13, first, with the virtual machine generation information 523 as an input, transmit the virtual OS setting instruction information 525 including a virtual machine name and OS information to the virtual OS setting accepting unit 422 of the hypervisor 420 indicated by the virtual machine generation information 523 (Step S261) and wait for the reception of processing completion from the virtual OS setting instructing unit 124 of the hypervisor 420 (Step S262) to output the virtual machine generation information 523.

(Description of Operation of Tenant Information Obtaining Processing)

The tenant information obtaining processing includes the following operation. The tenant information acquisition accepting unit 130 receives the tenant information acquisition request 530 from the terminal computer 300 to transmit the tenant information 531 to the terminal computer. The tenant information 531 is data input by the service manager through the input device of the terminal computer 300.

The tenant information obtaining processing realizes the mechanism (the feature (5) of the present invention) of obtaining virtual machines in the lump for each OS information and resolves the issue (the issue (5)) of the tenant's need of managing a virtual machine by OS information, for example, a domain suffix.

Figure 14:
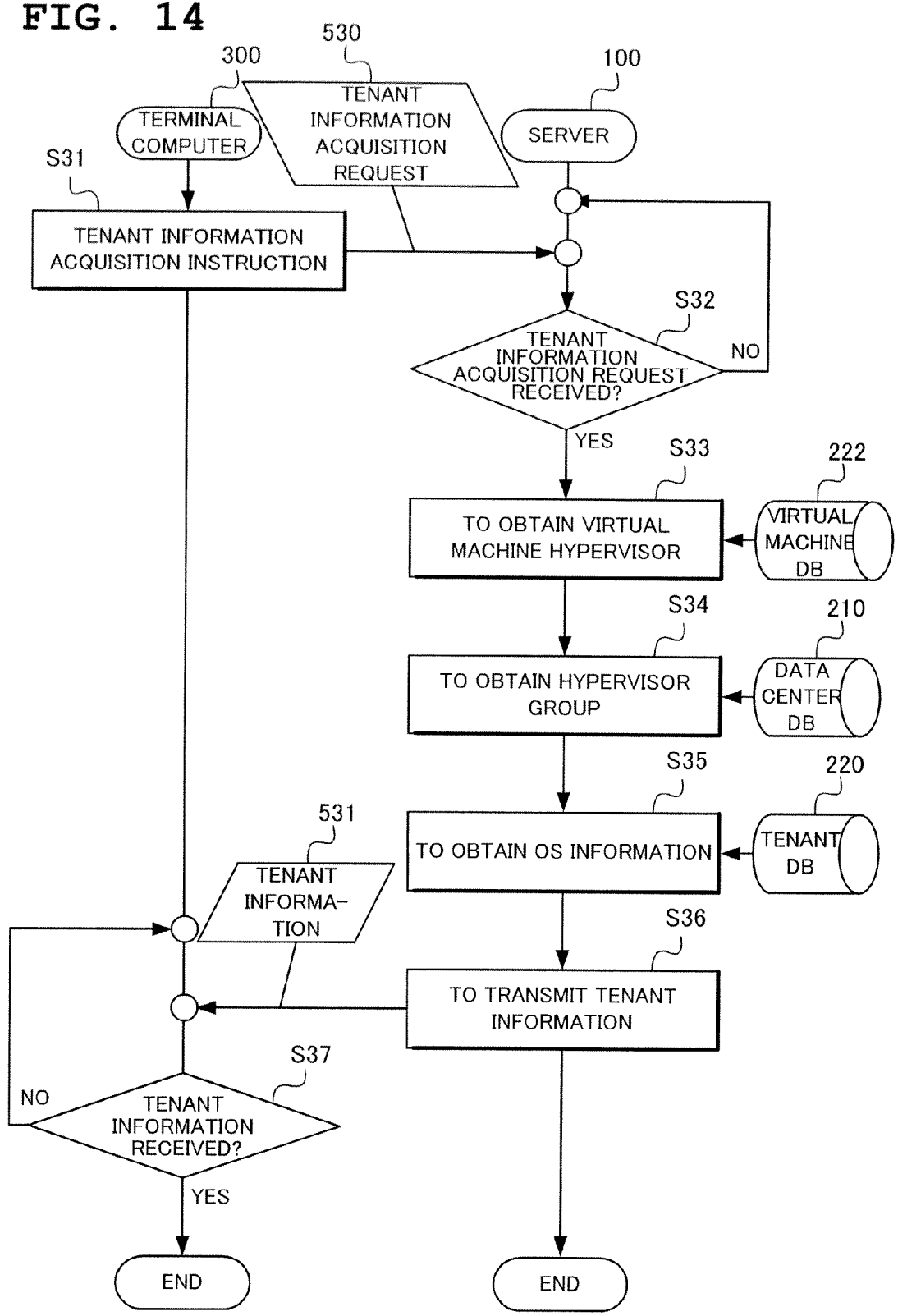
FIG. 14 is a flow chart showing operation of tenant information acquisition processing according to the first exemplary embodiment.

The tenant information obtaining processing proceeds according to the flow shown in FIG. 14 by using the tenant information acquisition accepting unit 130.

With reference to FIG. 14, the terminal computer 300 transmits the tenant information acquisition request 530 to the server 100 (Step S31), waits for the reception of the tenant information 531 from the server 100 (Step S37) and when receiving the tenant information 531, displays the result for the service manager through the output device of the terminal computer 300.

When, for example, the OS information of the tenant information 531 includes a domain suffix, gather virtual machine names of the tenant information 531 on a domain suffix basis, sort the virtual machine names in an ascending order and display the sorting result.

The server 100 waits for the reception of the tenant information acquisition request 530 from the terminal computer 300 (Step S32). Upon receiving the tenant information acquisition request 530, the tenant information acquisition accepting unit 130 obtains a hypervisor and a virtual machine name corresponding to the tenant of the tenant information acquisition request 530 from the virtual machine DB 222 (Step S33).

Next, the tenant information acquisition accepting unit 130 obtains a hypervisor group corresponding to the hypervisor from the data center DB 210 (Step S34).

Next, the tenant information acquisition accepting unit 130 obtains OS information corresponding to the hypervisor group and the tenant of the tenant information acquisition request 530 from the tenant DB 220 (Step S35) to transmit the tenant information 531 including the OS information and the virtual machine name to the terminal computer 300 (Step S36).

Effects of the First Exemplary Embodiment

The present exemplary embodiment has the following effects.

(1) VLAN is structured only for a layer 2 switch corresponding to a hypervisor in which a virtual machine is to be generated. The amount of time calculation for ensuring security of a network of a tenant is reduced from $O(2^n)$ to $O(n)$. In addition, since a VLAN is structured on demand by the VLAN group reservation unit, further reduction in the amount of calculation is realized.

(2) Only a VLAN group and OS information are used as a parameter for discriminating a network to prevent dependency on a network address. As a result, limiting a VLAN group mounting method to those using no IP address such as a tag VLAN enables use of the same IP address in a tenant.

(3) The mechanism provided for reserving a VLAN group being used by a tenant in a hypervisor group to prevent other tenant from using the group solves the confidentiality problem of being connected to a VLAN of other tenant in the hypervisor group. Accordingly, coexistence of accessibility and confidentiality is realized when setting up a tenant network in a data center on demand at the time of generation of a virtual machine in the thin client environment lending service.

(4) The mechanism provided for registering, as a hypervisor group, a combination of a hypervisor and a layer 2 switch to be used enables registration of apparatus expansion at the system. Apparatus expansion work and work for making a request to the system for virtual machine addition in response to a request from a tenant are completely separated to clarify a work task for each service manager.

(5) With the mechanism of obtaining virtual machines in the lump for each OS information, a service manager is allowed to obtain the number of virtual machines operating for each domain suffix, for example, in response to a request from a tenant. At a domain change, a virtual machine can be specified at the time of simultaneous domain change processing.

Second Exemplary Embodiment

By matching a hypervisor group apparatus range with a network segment, a VLAN group of a tenant can be unique within a range of a router.

By not matching a hypervisor group apparatus range with a network segment, a VLAN group unique in a tenant can be reserved among a plurality of routers.

The foregoing can be realized because a hypervisor group is data separate from a network segment, which requires no addition of a new function.

In addition, because a hypervisor group and OS information are not dependent on each other, virtual machines of a tenant which uses a plurality of domains, for example, can be managed by the same hypervisor or can be separated on a hypervisor group basis.

Third Exemplary Embodiment

When the server 100 manages a plurality of data centers 400, there occurs a problem that although since the server 100 fails to discriminate the data centers 400, it is not allowed to add a hypervisor of other data center 400 to a hypervisor group, the server 100 could register the hypervisor.

Solution of the problem is operation with a hypervisor group and a data center one-to-one corresponding to each other or addition of a data center column to the data center DB.

This allows the server 100 to manage a plurality of the data centers 400.

Fourth Exemplary Embodiment

In order to increase availability, a processing system and a DB inside the server 100 are arranged in separate servers. Since none of such a limitation is provided as depends on clustering or RAID for the purpose of increasing availability, combination with an arbitrary availability realization processing is possible.

First, when a processing system and a DB are arranged in separate servers, used are a network and a DBMS which enable servers to communicate for write to or read from a DB through a management network. Next, when a processing system is arranged in a separate server on a block basis, since no processing of the respective functions of hypervisor addition, virtual machine addition and tenant information acquisition depends on that of other function, each function can be arranged in a separate server.

Also as to each block of the virtual machine addition processing, use of such a network as enables data which is to be transmitted and received between blocks to be communicated through a management network makes operation of each block be input/output to/from the network, thereby enabling the respective blocks to be arranged in separate servers.

When constantly operating a plurality of processing systems to distribute loads, a load balancer can be disposed before connection to the server 100 on the management network 310.

Fifth Exemplary Embodiment

For designating the existing hypervisor 420 or the existing layer 2 switch 410 at the time of transmission of the hypervisor addition request 511 to the server 100, as data other than the hypervisor group information 510 of the data center DB 210, a hypervisor and a layer 2 switch are also designed to be received by the terminal computer 300 and transmitted by the server 100.

This enables management of the data center 400 in which the hypervisor 420 uses a plurality of layer 2 switches 410 or the data center 400 in which the layer 2 switch 410 is connected by a plurality of hypervisors 420.

Sixth Exemplary Embodiment

The VLAN structure accepting unit 411 is arranged in the hypervisor 420 to match the layer 2 switch 410 and the hypervisor 420 of the data center DB 210 with each other.

This enables an interface of the server 100 to access the layer 2 switch of the data center DB 210 without being aware of an apparatus structure.

Accordingly, the layer 2 switch outside the hypervisor can be used in the data center to enable co-use of a layer 2 switch provided in the hypervisor, thereby handling a case where the layer 2 switch function is provided in the hypervisor, that is, where a VLAN structuring interface and a VLAN itself are realized as a network function of the hypervisor.

Seventh Exemplary Embodiment

The server 100 comprises a virtual machine deletion instructing unit 140 to delete the virtual machine 423.

On this occasion, when none of the virtual machine 423 is on the hypervisor 420, release of a VLAN structure on the layer 2 switch 410 is enabled. When none of the virtual machine 423 is in the hypervisor group 420, release of a reserved VLAN group is enabled.

Since the virtual machine 423 might be newly added, release of a VLAN structure is designed to be executed at the time of freeing a reserved VLAN group.

Lastly freeing a reserved VLAN group guarantees that a VLAN structure is released and that none of the virtual machine 423 is on the hypervisor 420.

Eighth Exemplary Embodiment

For a tenant, availability of a virtual machine should be high in the thin client environment lending service. Apparatus is, however, liable to develop a fault, so that high availability of a virtual machine is realized by an inter-hypervisor shifting technique. It is also possible to reflect on a system an effect that inter-hypervisor shifting is executed.

As a flow of the processing, processing of the DB and the layer 2 switch 410 at the time of virtual machine deletion is executed in the server 100 and thereafter processing of the DB and the layer 2 switch 410 at the time of virtual machine addition is executed.

On this occasion, since the hypervisor 420 changes, the layer 2 switch 410 might be changed.

In order to cope with a change of a hypervisor in which the virtual machine 423 operates, structure a VLAN in a target switch as required by obtaining the virtual machine 423 operating on the hypervisor 420 and extracting difference from the hypervisor of the virtual machine DB 222 to refer to the data center DB 210, the tenant DB 220 and the switch DB 221.

It should be noted to use a VLAN reservation unit and index a VLAN group yet to be used when exceeding the hypervisor group. VLAN of the layer 2 switch 410 corresponding to the shifting source hypervisor 420 should be deleted as required.

Ninth Exemplary Embodiment

Although no recitation is made as to the virtual machine generation processing (Step S253) that after generating the virtual machine 423, the virtual OS 425 to be installed can be designated, adaptable as a method of installing the virtual OS 425 is, for example, installation from an ISO image of OS, spreading from a deploy template, or the like.

When using Oss of a plurality of virtual machines, the server 100 receives the virtual machine addition request 520 with a column of the installed OS or template added and when the hypervisor 420 is capable of handling the addition, transmits the virtual machine generation instruction information 524 with the column of the installed OS or template added to the virtual machine generation accepting unit 421.

Other than OS, simply adding a CPU frequency, a memory capacity and a disk capacity to a column makes the virtual machine addition request 520 conform to real operation.

This enables use of Oss of a plurality of virtual machines.

Tenth Exemplary Embodiment

Addition of an interface to the server 100 enables a tenant which will be affected by occurrence of a failure to be specified.

When a layer 2 switch develops a fault, for example, acquisition of a hypervisor of the data center DB and a tenant of the virtual machine DB allows just a DB currently existing in the server to obtain a tenant and a virtual machine which will be affected by the failure. When a virtual machine develops a fault, for example, all the tenants using the same hypervisor can be obtained.

Eleventh Exemplary Embodiment

Addition of an interface to the server 100 enables information necessary for switching a switch to be taken out.

In a case of switching of a layer 2 switch, for example, since information of a VLAN structured in the layer 2 switch can be obtained from the switch DB, the switch as of after switching can be brought into the same operation state as that before the switching. Furthermore, addition of a further interface enables automatic reflection of data of the switch DB on a new switch at the time of switching the switch.

Twelfth Exemplary Embodiment

Since the tenant DB has at least one OS information, the value is used to execute tenant DB writing processing.

This enables omission of OS information at second and following virtual machine addition requests.

Thirteenth Exemplary Embodiment

Omission of a hypervisor is enabled at a virtual machine addition request. In a case, for example, of a policy where a service manager operates up to a number n of virtual machines on a hypervisor, the number of virtual machines on each hypervisor can be found from data of the virtual machine DB, so that arranging differences from n in an ascending order leads to sequential designation of hypervisors starting with a hypervisor whose number of virtual machines operating is the least.

Fourteenth Exemplary Embodiment

Addition of a virtual machine can be automatically realized only by the number of machines. In addition to omission of OS information and a hypervisor, automatically determining a virtual machine name, for example, with "VM-001" as an initial value, incrementing the number such as "VM-002", "VM-003" to repeat the processing as many times as the number of machines to facilitate operation of a service manager.

Fifteenth Exemplary Embodiment

Other than a network for use when using a virtual machine, a network for realizing the thin client environment 10 includes a network between a storage device in which the virtual machine 423 operable on the hypervisors 420 is arranged in the data center 400 and the hypervisor, for example, SAN, and a zone as a security unit of SAN can be managed by a tenant on demand.

While used as data to be handled by the server 100 is the VLAN 412 as a unit whose security is ensured on the network of the virtual machine 423, the SAN network handles a zone in the present exemplary embodiment.

Then, in the tenant DB 220, additionally having a SAN zone as a column manages a reservation state of the SAN zone, in the data center DB 210, having a SAN as a column manages a SAN corresponding to a hypervisor and in the switch DB, a zone actually structured on a SAN is managed.

For realizing the function, as an interface is assumed which is allowed to structure the VLAN 412 outside the layer 2 switch 410, an interface which is capable of generating a zone in the SAN from outside is required.

In addition, because a hypervisor group and a SAN may fail to coincide in a management range, it is desirable to separately operate VLAN group reservation for each hypervisor group and zone reservation for each SAN.

When matching a hypervisor group and a SAN, a SAN zone can be ensured for each VLAN group and in this case, compatibility is excellent with the virtual machine's function of shifting between hypervisors.

Sixteenth Exemplary Embodiment

As a network which realizes the thin client environment 10 other than a network for use when using the virtual machine 423, a remote network 30 leading to the tenant network 440 in the data center from a virtual machine terminal 20 is realized by, for example, an internal network of an office of a tenant and VPN connection. VPN can be also managed by a tenant on demand.

First, data of an internal network interface of an office of a tenant for the connection to the data center 400, for example, a global IP address of a VPN router in an office of a tenant to be disposed at the time of making a thin client service contract, is managed by the server 100. Then, a global IP address of a VPN router for each data center is managed by the server 100. Then, a block for which the VPN is reserved and a block in which the VPN is actually set in each data center are held by the server 100.

In practice, management will be executed on a hypervisor group basis, so that a VPN will be reserved independently from VLAN group reservation. Since on demand management realizes such a function of updating keys in the lump which are used, for example, when IPsec is used for VPN connection of a certain tenant, it is possible for a system to cope with service including VPN key update interval as a contract condition.

Seventeenth Exemplary Embodiment

For each tenant, QoS, for example, a band to be assigned can be handled.

Although a method of executing QoS reservation and QoS setting to a switch on demand can be realized by the same procedure as that of VLAN reservation • on-demand VLAN structuring, there occurs a case where a reserved QoS will not be satisfied depending on physical wiring or a change of performance of a layer 2 switch by the number of tenants and the number of virtual machines that use the layer 2 switch.

Therefore, added to the structure is a function of executing processing of checking whether QoS can be ensured or not at the time of structuring a VLAN on a layer 2 switch or determining in advance upper limit values of the number of tenants and the number of virtual machines that use the layer 2 switch to check whether the number reaches the upper limit value or not at the time of acceptance of virtual machine addition and notifying the terminal 300 that the hypervisor 420 is not usable because of failure in ensuring QoS.

Figure 15:
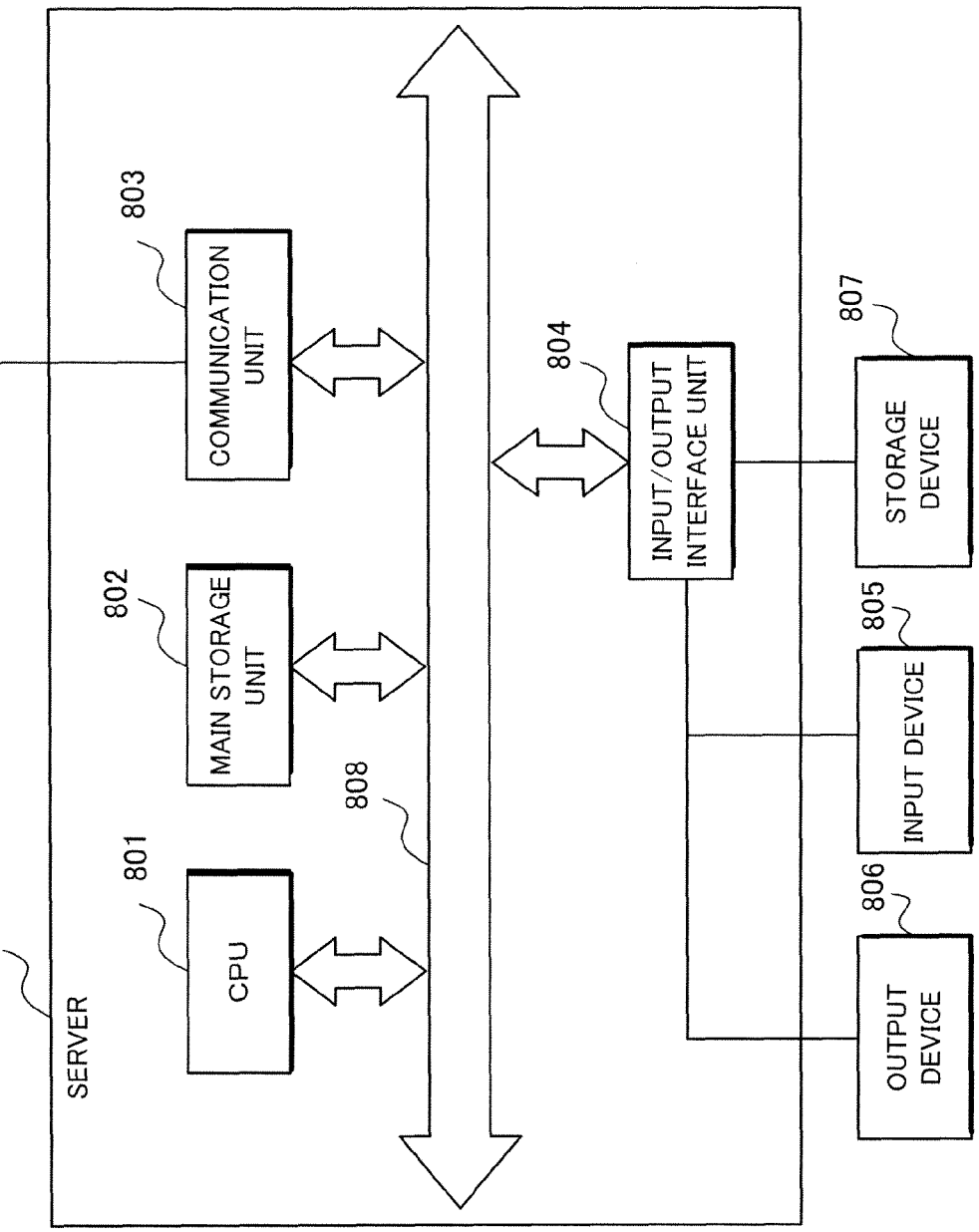
FIG. 15 is a block diagram showing an example of a hardware structure of a server of the present invention.

Next, description will be made of an example of a hardware structure of the server 100 of the present invention with reference to FIG. 15. FIG. 15 is a block diagram showing an example of a hardware structure of the server 100.

With reference to FIG. 15 the server 100, which has the same hardware structure as that of a common computer device, comprises a CPU (Central Processing unit) 801, a main storage unit 802 formed of a memory such as a RAM (Random Access Memory) for use as a data working region or a data temporary saving region, a communication unit 803 which transmits and receives data through a network, an input/output interface unit 804 connected to an input device 805, an output device 806 and a storage device 807 to transmit and receive data, and a system bus 808 which connects each of the above-described components with each other. The storage device 807 is realized by a hard disk device formed of a non-volatile memory, for example, a ROM (Read Only Memory), a magnetic disk, a semiconductor memory or the like.

The virtual OS setting instructing unit 124, the virtual machine generation instructing unit 123, the VLAN structure instructing unit 122, the VLAN group reservation unit 121, the tenant information acquisition accepting unit 130, the virtual machine addition accepting unit 120, the hypervisor group information obtaining unit 110 and the hypervisor addition accepting unit 111 of the server 100 of the present invention have their operations realized not only in hardware by mounting a circuit part as a hardware part such as an LSI (Large Scale Integration) with a program incorporated but also in software by storing a program which provides their functions in the storage device 807, loading the program into the main storage unit 802 and executing the same by the CPU 801.

While the present invention has been described with respect to the preferred exemplary embodiments in the foregoing, such is not necessarily limited to the above-described exemplary embodiments. Modification and variation of the present invention will be obvious without departing from the scope of its technical idea.

Arbitrary combination of the foregoing components and expressions of the present invention converted to/from a method, a device, a system, a recording medium, a computer program and the like are also available as a mode of the present invention.

In addition, the various components of the present invention need not always be independent from each other and a plurality of components may be formed as one member, or one component may be formed by a plurality of members, or a certain component may be a part of other component, or a part of a certain component and a part of other component may overlap with each other, or the like.

While the method and the computer program of the present invention have a plurality of procedures recited in order, the order of recitation is not a limitation to the order of execution of the plurality of procedures. When executing the method and the computer program of the present invention, therefore, the order of execution of the plurality of procedures can be changed without disturbing the contents.

The plurality of procedures of the method and the computer program of the present invention are not limited to execution at timing different from each other. Therefore, during the execution of a certain procedure, other procedure may occur, or a part or all of execution timing of a certain procedure and execution timing of other procedure may overlap with each other, or the like.

INCORPORATION BY REFERENCE

This application is based upon and claims the benefit of priority from Japanese patent application No. 2011-054138, filed on Mar. 11, 2011 the disclosure of which is incorporated herein in its entirety by reference.

INDUSTRIAL APPLICABILITY

The present invention is applicable to such a field where a network resource having an upper limit on a contract basis is assigned on demand as the field of thin client environment lending service of the present invention, a field of radio base station resource distribution handling (assigning a base station resource to a tenant on demand to have confidentiality among tenants, enabling WIFI to be used in an area where a tenant has the same ESSID, controlling MIMO of high-speed mobile communication WiMAX etc., and securing of accessibility and confidentiality when a robot owned by a tenant uses a public radio base station, etc.), a field of sensor network resource distribution handling (assigning a sensor or data collected therefrom to a tenant on demand to have confidentiality among tenants, service of delivering information about a temperature sensor in each region owned by a tenant, etc.), and a field of sharing special environment resources such as an artificial satellite by tenants (in a case where service of lending an artificial satellite is allowed, for example, providing security on demand when sharing a band of communication with a satellite or a network resource on an artificial satellite among tenants).

What is claimed is:

1. A thin client environment providing system, comprising:
   a data center including at least one hypervisor and at least one layer 2 switch;
   a server; and
   at least one terminal computer;
   wherein said server includes:
      a VLAN group reservation unit which when receiving, from said terminal computer, a virtual machine addition request including information of a tenant, information of a virtual OS and information of a generation destination hypervisor, obtains from a data center DB which stores information of the hypervisor, information of a hypervisor group and information of the layer 2 switch so as to be correlated with each other, the information of the hypervisor group and the information of the layer 2 switch corresponding to said generation destination hypervisor, extracts, from a tenant DB which stores information of the tenant, information of the hypervisor group, information of a VLAN group and information of the virtual OS so as to be correlated with each other, the information of the VLAN group corresponding to the information of the hypervisor group obtained from said data center DB, and the information of the tenant and information of the OS included in said virtual machine addition request, and when no relevant information of a VLAN group exists, indexes a new VLAN group and registers information of the new VLAN group with said tenant DB to reserve the new VLAN group;
      a VLAN structure instructing unit which, when none of the VLAN group extracted or registered by said VLAN group reservation unit is registered with a switch DB which stores information of said layer 2 switch and information of a VLAN group so as to be correlated with each other, registers the information of the layer 2 switch obtained from the data center DB and the information of the VLAN group extracted or registered by the VLAN group reservation unit so as to be correlated with each other, as well as transmitting a request for structuring a VLAN with the information of the VLAN group extracted or registered by the VLAN group reservation unit to the data center; and a virtual machine generation instructing unit which instructs the data center to add a virtual machine, wherein the VLAN structure instructing unit outputs virtual machine generation information with the information of the VLAN group extracted or registered by the VLAN group reservation unit added to the virtual machine addition request, and wherein the virtual machine generation instructing unit instructs the data center to add the virtual machine based on the virtual machine generation information.

2. The thin client environment providing system according to claim 1, wherein said server comprises a virtual OS setting instructing unit which instructs about the virtual OS to be set at the virtual machine whose generation is instructed by said virtual machine generation instructing unit, and wherein said virtual OS setting instructing unit gives a virtual OS setting instruction to said data center based on the information of said virtual OS included in said virtual machine generation information.

3. The thin client environment providing system according to claim 1, wherein said layer 2 switch comprises a VLAN structure accepting unit which accepts a request from said VLAN structure instructing unit, and wherein said VLAN structure accepting unit newly structures the VLAN with the information of the VLAN group instructed by said VLAN structure instructing unit.

4. The thin client environment providing system according to claim 1, wherein said server includes a hypervisor group information obtaining unit which transmits, when requested for information of the hypervisor group from said terminal computer, the information of said hypervisor group registered with said data center DB to said terminal computer.

5. The thin client environment providing system according to claim 1, wherein said server comprises a hypervisor addition accepting unit which adds the hypervisor based on a hypervisor addition request from said terminal computer, and wherein said hypervisor addition accepting unit registers information of the hypervisor to be added which is included in said hypervisor addition request, information of the hypervisor group of the hypervisor to be added and information of the corresponding layer 2 switch with said data center DB so as to be correlated with each other.

6. The thin client environment providing system according to claim 1, wherein said server comprises a tenant information acquisition accepting unit which transmits, in response to a request for obtaining information of a predetermined tenant from the terminal computer, information of the corresponding tenant, and wherein said tenant information acquisition accepting unit obtains, from a virtual machine DB which stores information of the tenant, information of the hypervisor and information of the virtual machine so as to be correlated with each other, a combination of the information of the hypervisor and the information of the virtual machine tied with the tenant requested from said terminal computer to transmit information of the obtained combination to said terminal computer.

7. A server of a thin client environment providing system including a data center including at least one hypervisor and at least one layer 2 switch, the server, and at least one terminal computer, the server comprising:

a VLAN group reservation unit which when receiving, from said terminal computer, a virtual machine addition request including information of a tenant, information of a virtual OS and information of a generation destination hypervisor, obtains from a data center DB which stores information of the hypervisor, information of a hypervisor group and information of the layer 2 switch so as to be correlated with each other, the information of the hypervisor group and the information of the layer 2 switch corresponding to said generation destination hypervisor, extracts, from a tenant DB which stores the information of the tenant, the information of the hypervisor group, information of a VLAN group and the information of the virtual OS so as to be correlated with each other, the information of the VLAN group corresponding to the information of the hypervisor group obtained from said data center DB, and the information of the tenant and the information of the OS included in said virtual machine addition request, and when no relevant information of a VLAN group exists, indexes a new VLAN group and registers information of the new VLAN group with said tenant DB to reserve the new VLAN group;

a VLAN structure instructing unit which, when none of the VLAN group extracted or registered by said VLAN group reservation unit is registered with a switch DB which stores the information of said layer 2 switch and the information of a VLAN group so as to be correlated with each other, registers the information of the layer 2 switch obtained from the data center DB and the information of the VLAN group extracted or registered by the VLAN group reservation unit so as to be correlated with each other, as well as transmitting a request for structuring a VLAN with the information of the VLAN group extracted or registered by the VLAN group reservation unit to the data center; and a virtual machine generation instructing unit which instructs the data center to add a virtual machine, wherein the VLAN structure instructing unit outputs virtual machine generation information with the VLAN group extracted or registered by the VLAN group reservation unit added to the virtual machine addition request, and wherein the virtual machine generation instructing unit instructs the data center to add the virtual machine based on the virtual machine generation information.

8. The server according to claim 7, further comprising:

a virtual OS setting instructing unit which instructs about the virtual OS to be set at the virtual machine whose generation is instructed by said virtual machine generation instructing unit, wherein said virtual OS setting instructing unit gives a virtual OS setting instruction to said data center based on the information of said virtual OS included in said virtual machine generation information.

9. The server according to claim 7, further including a hypervisor group information obtaining unit which transmits, when requested for information of the hypervisor group from said terminal computer, the information of said hypervisor group registered with said data center DB to said terminal computer.

10. The server according to claim 7, further comprising a hypervisor addition accepting unit which adds the hypervisor based on a hypervisor addition request from said terminal computer, wherein
said hypervisor addition accepting unit registers information of the hypervisor to be added which is included in said hypervisor addition request, information of the hypervisor group of the hypervisor and information of the corresponding layer 2 switch with said data center DB so as to be correlated with each other.

11. The server according to claim 7, further comprising a tenant information acquisition accepting unit which transmits, in response to a request for obtaining information of a predetermined tenant from the terminal computer, information of the corresponding tenant, wherein
said tenant information acquisition accepting unit obtains, from a virtual machine DB which stores information of the tenant, information of the hypervisor and information of the virtual machine so as to be correlated with each other, a combination of the information of the hypervisor and the information of the virtual machine tied with the tenant requested from said terminal computer to transmit information of the obtained combination to said terminal computer.

12. A thin client environment management method in a thin client environment providing system comprising a data center including at least one hypervisor and at least one layer 2 switch, a server, and at least one terminal computer, wherein the method comprises:
in the server:
VLAN group reservation comprising, when receiving from said terminal computer a virtual machine addition request including information of a tenant, information of a virtual OS and information of a generation destination hypervisor, obtaining from a data center DB which stores information of the hypervisor, information of a hypervisor group and information of the layer 2 switch so as to be correlated with each other, the information of the hypervisor group and the information of the layer 2 switch corresponding to said generation destination hypervisor, extracting, from a tenant DB which stores the information of the tenant, the information of the hypervisor group, information of a VLAN group and the information of the virtual OS so as to be correlated with each other, the information of the VLAN group corresponding to the information of the hypervisor group obtained from said data center DB, and the information of the tenant and the information of the OS included in said virtual machine addition request, and when no relevant information of a VLAN group exists, indexing a new VLAN group and registering information of the new VLAN group with said tenant DB to reserve the new VLAN group;
VLAN structure instructing comprising, when none of the VLAN group extracted or registered at said VLAN group reservation is registered with a switch DB which stores the information of said layer 2 switch and the information of a VLAN group so as to be correlated with each other, registering the information of the layer 2 switch obtained from the data center DB and the information of the VLAN group extracted or registered by the VLAN group reservation unit so as to be correlated with each other, as well as transmitting a request for structuring a VLAN with the information of the VLAN group extracted or registered by the VLAN group reservation unit to the data center; and
virtual machine generation instructing comprising instructing the data center to add a virtual machine,
wherein the VLAN structure instructing includes outputting of virtual machine generation information with the VLAN group extracted or registered at the VLAN group reservation added to the virtual machine addition request, and
wherein the virtual machine generation instructing includes giving an instruction to the data center to add the virtual machine based on the virtual machine generation information.

13. The thin client environment management method according to claim 12, wherein
said server comprises a virtual OS setting instructing of instructing about the virtual OS to be set at the virtual machine whose generation is instructed at said virtual machine generation instructing, and
said virtual OS setting instructing includes instructing said data center to set the virtual OS based on the information of said virtual OS included in said virtual machine generation information.

14. The thin client environment management method according to claim 12, wherein
said layer 2 switch comprises a VLAN structure accepting of accepting a request from said VLAN structure instructing, and
said VLAN structure accepting includes new structuring of the VLAN by the VLAN group instructed at said VLAN structure instructing.

15. The thin client environment management method according to claim 12, wherein said server comprises a hypervisor group information obtaining of transmitting, when requested for information of the hypervisor group from said terminal computer, the information of said hypervisor group registered with said data center DB to said terminal computer.

16. The thin client environment management method according to claim 12, wherein said server comprises a hypervisor addition accepting of adding the hypervisor based on a hypervisor addition request from said terminal computer, and wherein
said hypervisor addition accepting includes registering information of the hypervisor to be added which is included in said hypervisor addition request, information of the hypervisor group of the hypervisor and information of the corresponding layer 2 switch with said data center DB so as to be correlated with each other.

17. The thin client environment management method according to claim 12, wherein said server comprises a tenant information acquisition accepting of transmitting, in response to a request for obtaining information of a predetermined tenant from the terminal computer, information of the corresponding tenant, and wherein
said tenant information acquisition accepting includes obtaining, from a virtual machine DB which stores information of the tenant, information of the hypervisor and information of the virtual machine so as to be correlated with each other, a combination of the information of the hypervisor and the information of the virtual machine tied with the tenant requested from said terminal computer to transmit information of the obtained combination to said terminal computer.

18. A computer-readable non-transitory storage medium storing a thin client environment management program in a thin client environment providing system comprising a data center including at least one hypervisor and at least one layer 2 switch, a server, and at least one terminal computer, wherein said thin client environment management program causes said server to execute:
- VLAN group reservation processing comprising, when receiving from said terminal computer a virtual machine addition request including information of a tenant, information of a virtual OS and information of a generation destination hypervisor, obtaining from a data center DB which stores information of the hypervisor, information of a hypervisor group and information of the layer 2 switch so as to be correlated with each other, the information of the hypervisor group and the information of the layer 2 switch corresponding to said generation destination hypervisor, extracting, from a tenant DB which stores the information of the tenant, the information of the hypervisor group, information of a VLAN group and the information of the virtual OS so as to be correlated with each other, the information of the VLAN group corresponding to the information of the hypervisor group obtained from said data center DB, and the information of the tenant and the information of the OS included in said virtual machine addition request, and when no relevant information of a VLAN group exists, indexing a new VLAN group and registering information of the new VLAN group with said tenant DB to reserve the new VLAN group;
- VLAN structure instructing processing comprising, when none of the VLAN group extracted or registered by said VLAN group reservation processing is registered with a switch DB which stores the information of said layer 2 switch and the information of a VLAN group so as to be correlated with each other, registering the information of the layer 2 switch obtained from the data center DB and the information of the VLAN group extracted or registered by the VLAN group reservation unit so as to be correlated with each other, as well as transmitting a request for structuring a VLAN with the information of the VLAN group extracted or registered by the VLAN group reservation unit to the data center; and
- virtual machine generation instructing processing comprising instructing the data center to add a virtual machine,
- wherein the VLAN structure instructing processing includes outputting virtual machine generation information with the VLAN group extracted or registered by the VLAN group reservation processing added to the virtual machine addition request, and
- wherein the virtual machine generation instructing processing includes giving an instruction to the data center to add the virtual machine based on the virtual machine generation information.

19. The computer-readable non-transitory storage medium according to claim 18, wherein
- said thin client environment management program causes said server to execute the virtual OS setting instructing processing of instructing about the virtual OS to be set at the virtual machine whose generation is instructed by said virtual machine generation instructing processing, wherein
- said virtual OS setting instructing processing includes instructing said data center to set the virtual OS based on the information of said virtual OS included in said virtual machine generation information.

20. The computer-readable non-transitory storage medium according to claim 18, wherein said thin client environment management program causes said layer 2 switch to execute the VLAN structure accepting processing of accepting a request from said VLAN structure instructing processing, wherein
- said VLAN structure accepting processing includes new structuring of the VLAN by the VLAN group instructed by said VLAN structure instructing processing.

21. The computer-readable non-transitory storage medium according to claim 18, wherein said thin client environment management program causes said server to execute the hypervisor group information obtaining processing of transmitting, when requested for information of the hypervisor group from said terminal computer, the information of said hypervisor group registered with said data center DB to said terminal computer.

22. The computer-readable non-transitory storage medium according to claim 18, wherein said thin client environment management program causes said server to execute the hypervisor addition accepting processing of adding the hypervisor based on a hypervisor addition request from said terminal computer, wherein
- said hypervisor addition accepting processing includes registering information of the hypervisor to be added which is included in said hypervisor addition request, information of the hypervisor group of the hypervisor and information of the corresponding layer 2 switch with said data center DB so as to be correlated with each other.

23. The computer-readable non-transitory storage medium according to claim 18, wherein said thin client environment management program causes said server to execute the tenant information acquisition accepting processing of transmitting, in response to a request for obtaining information of a predetermined tenant from the terminal computer, information of the corresponding tenant, wherein
- said tenant information acquisition accepting processing includes obtaining, from a virtual machine DB which stores information of the tenant, information of the hypervisor and information of the virtual machine so as to be correlated with each other, a combination of the information of the hypervisor and the information of the virtual machine tied with the tenant requested from said terminal computer to transmit information of the obtained combination to said terminal computer.

* * * * *